(12) United States Patent
Shimizu et al.

(10) Patent No.: US 12,198,657 B2
(45) Date of Patent: Jan. 14, 2025

(54) IMAGE PROCESSING DEVICE, IMAGE PROCESSING METHOD, AND IMAGE DISPLAY DEVICE

(71) Applicant: Sony Semiconductor Solutions Corporation, Kanagawa (JP)

(72) Inventors: Akira Shimizu, Saitama (JP); Toshichika Mikami, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/258,419

(22) PCT Filed: Dec. 1, 2021

(86) PCT No.: PCT/JP2021/044139
§ 371 (c)(1),
(2) Date: Jun. 20, 2023

(87) PCT Pub. No.: WO2022/158132
PCT Pub. Date: Jul. 28, 2022

(65) Prior Publication Data
US 2024/0038199 A1    Feb. 1, 2024

(30) Foreign Application Priority Data
Jan. 22, 2021   (JP) .................................. 2021-009056

(51) Int. Cl.
G09G 5/12    (2006.01)
(52) U.S. Cl.
CPC ....................... *G09G 5/12* (2013.01)
(58) Field of Classification Search
CPC . G06T 7/74; G06T 2207/30201; G06V 10/24; G06V 10/32; G06V 40/162;
(Continued)

(56) References Cited

U.S. PATENT DOCUMENTS

| | | | |
|---|---|---|---|
| 2001/0015771 A1* | 8/2001 | Kishimoto | H04N 5/073 348/730 |
| 2004/0183933 A1* | 9/2004 | Nasu | H04N 25/00 348/E5.037 |

(Continued)

FOREIGN PATENT DOCUMENTS

| | | |
|---|---|---|
| JP | H09065235 A | 3/1997 |
| JP | 2017090721 A | 5/2017 |

(Continued)

OTHER PUBLICATIONS

International Search Report (PCT/ISA/210), International Application No. PCT/JP2021/044139, dated Jan. 11, 2022.

*Primary Examiner* — Shaheda A Abdin
(74) *Attorney, Agent, or Firm* — Michael Best & Friedrich LLP

(57) ABSTRACT

An image processing device according to the present disclosure includes: an input section that receives an input image signal including an input synchronization signal and input image data; a first processor that performs first processing on the basis of the input image data at a timing corresponding to the input synchronization signal; a synchronization signal generator that generates an output synchronization signal; a second processor that performs second processing on the basis of a processing result of the first processing at a timing corresponding to the input synchronization signal or a timing corresponding to the output synchronization signal; a controller that controls at which timing of the timing corresponding to the input synchronization signal and the timing corresponding to the output synchronization signal the second processor is to perform the second processing; a third processor that performs third processing on the basis of a processing result of the second processing at a timing corresponding to the output synchronization signal to generate output image data; and an output (Continued)

section that outputs an output image signal including the output synchronization signal and the output image data.

18 Claims, 10 Drawing Sheets

(58) Field of Classification Search
CPC ...... H04N 25/79; H04N 25/73; H04N 23/665; H04N 25/76; H03K 21/406; H03K 21/38
See application file for complete search history.

(56) References Cited

U.S. PATENT DOCUMENTS

| | | | |
|---|---|---|---|
| 2010/0103326 A1* | 4/2010 | Murakami | H04N 5/04 348/E5.057 |
| 2013/0016199 A1* | 1/2013 | Kobayashi | G09G 5/12 348/E7.085 |
| 2015/0189127 A1* | 7/2015 | Ishii | H04N 21/44004 348/513 |

FOREIGN PATENT DOCUMENTS

| | | | |
|---|---|---|---|
| JP | 2019184743 A | 10/2019 | |
| JP | 2020071485 A | 5/2020 | |
| WO | 2010046990 A1 | 4/2010 | |
| WO | 2012029228 A1 | 3/2012 | |

\* cited by examiner

[ FIG. 1 ]

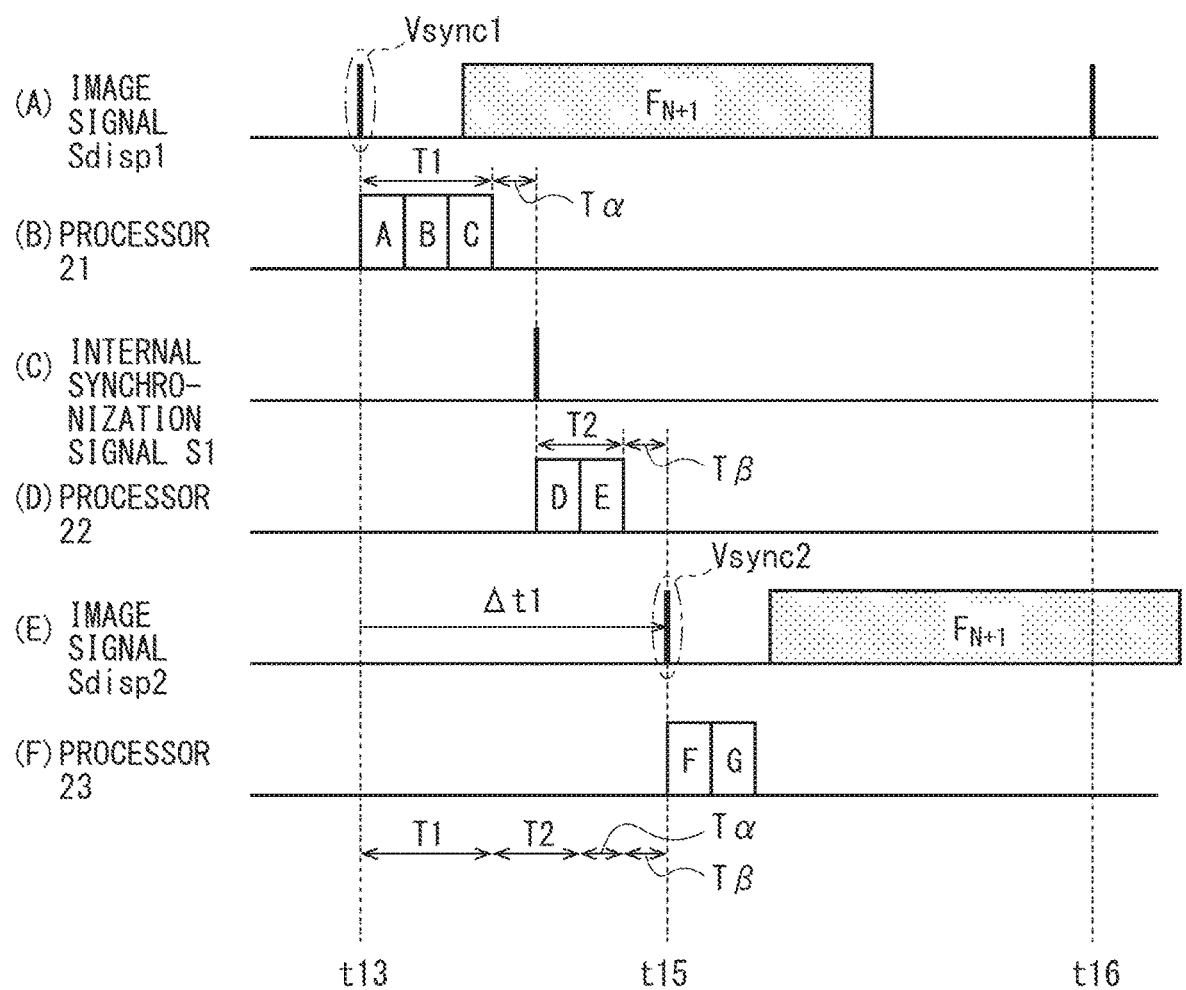

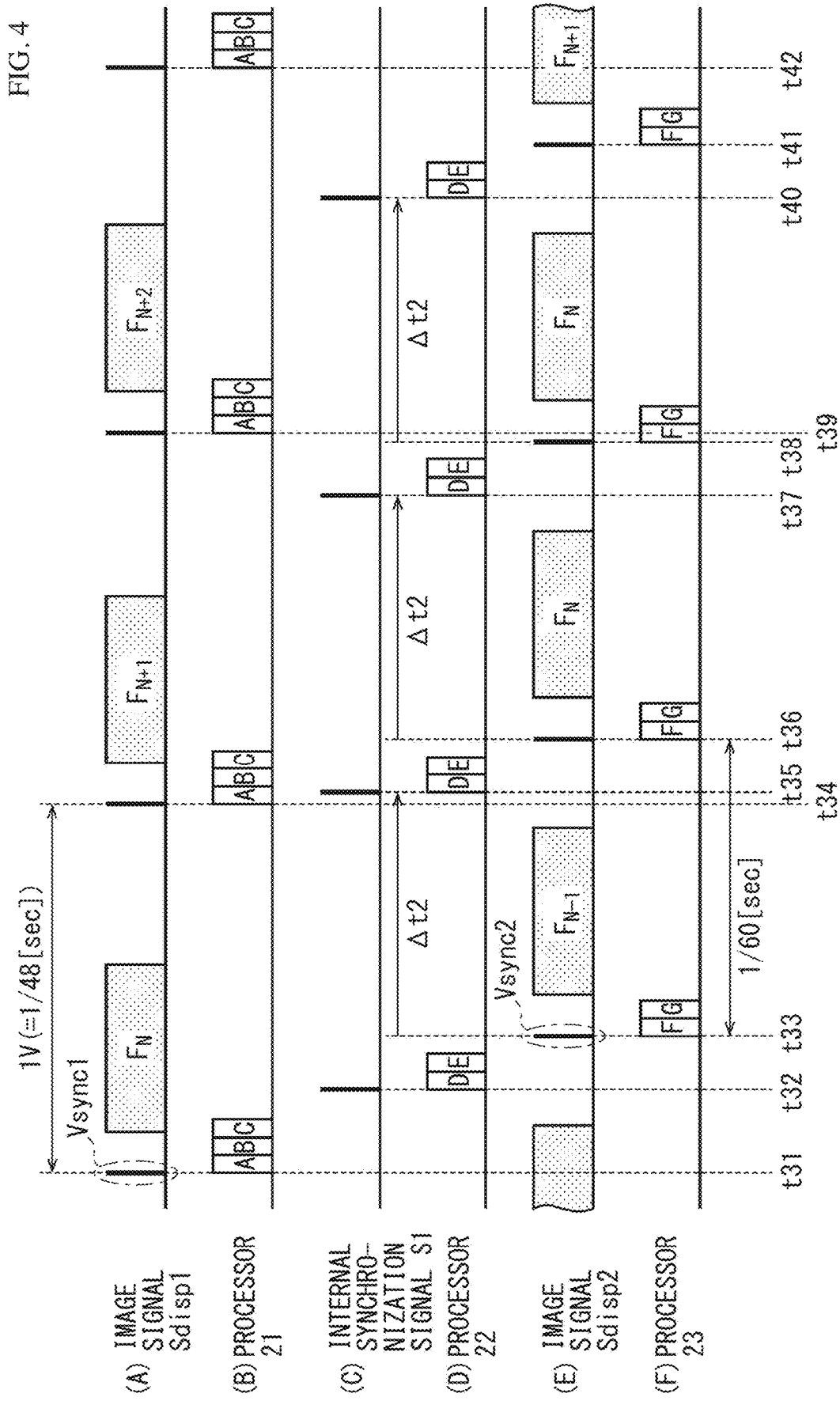

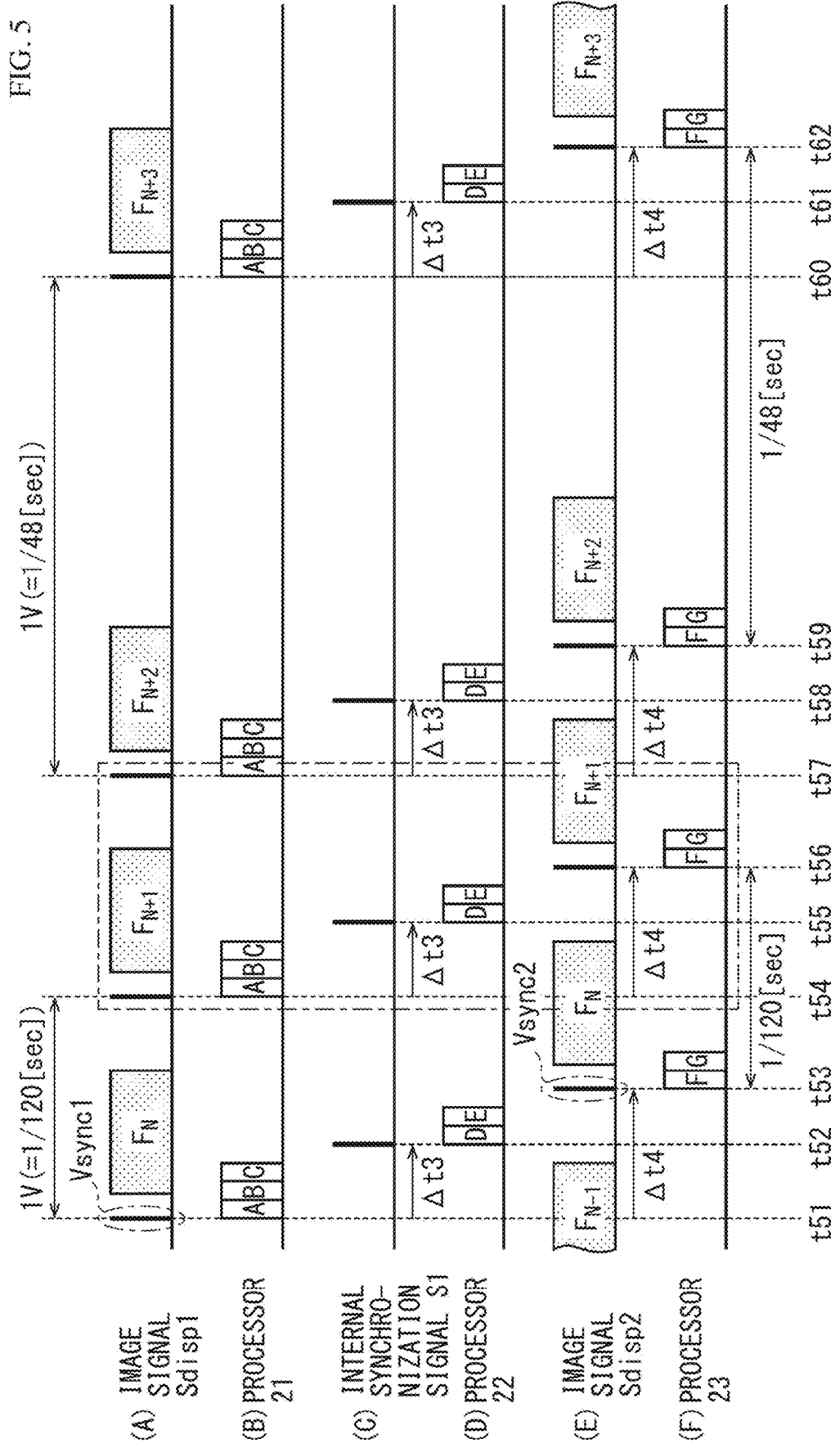

[FIG. 6]
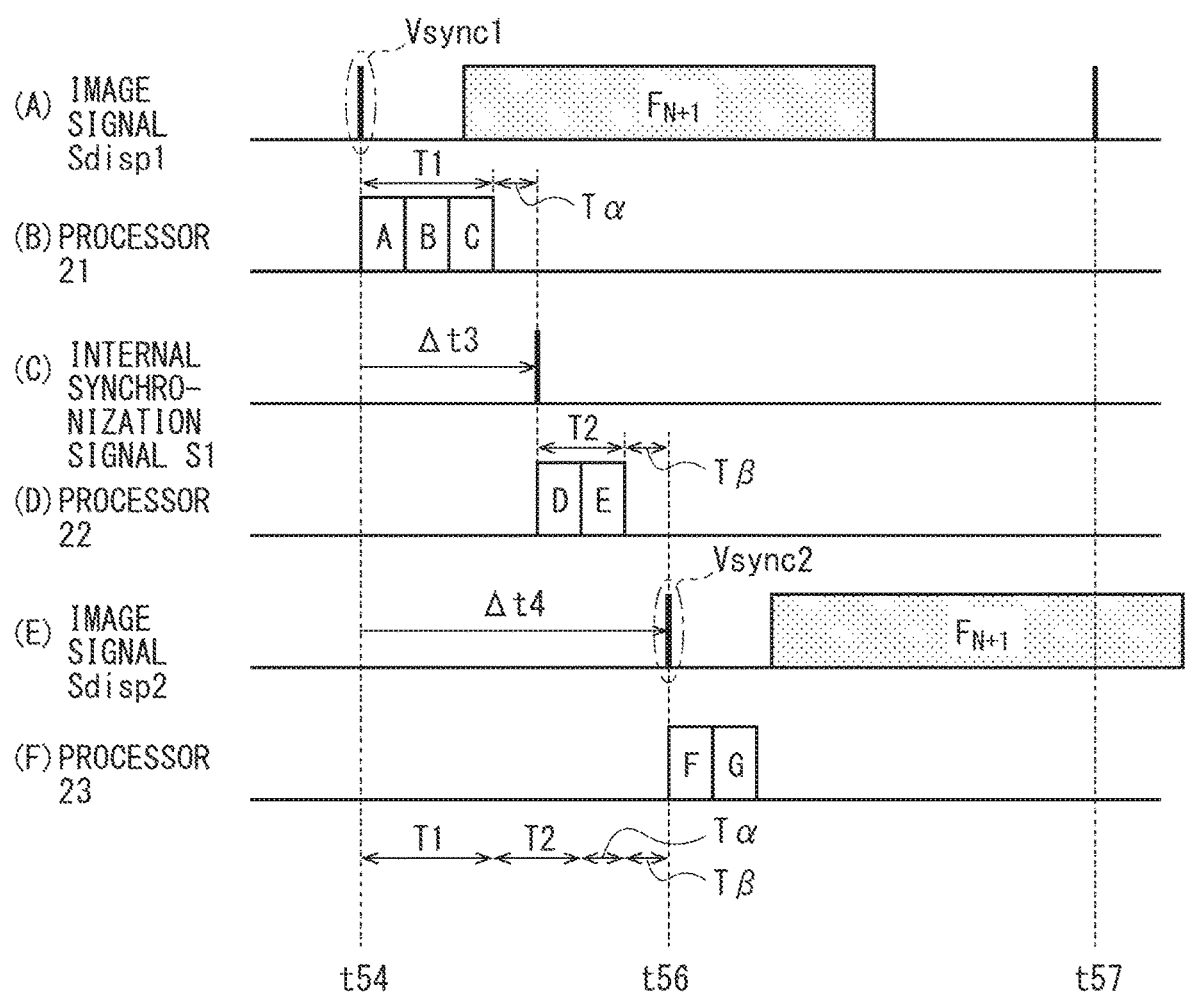

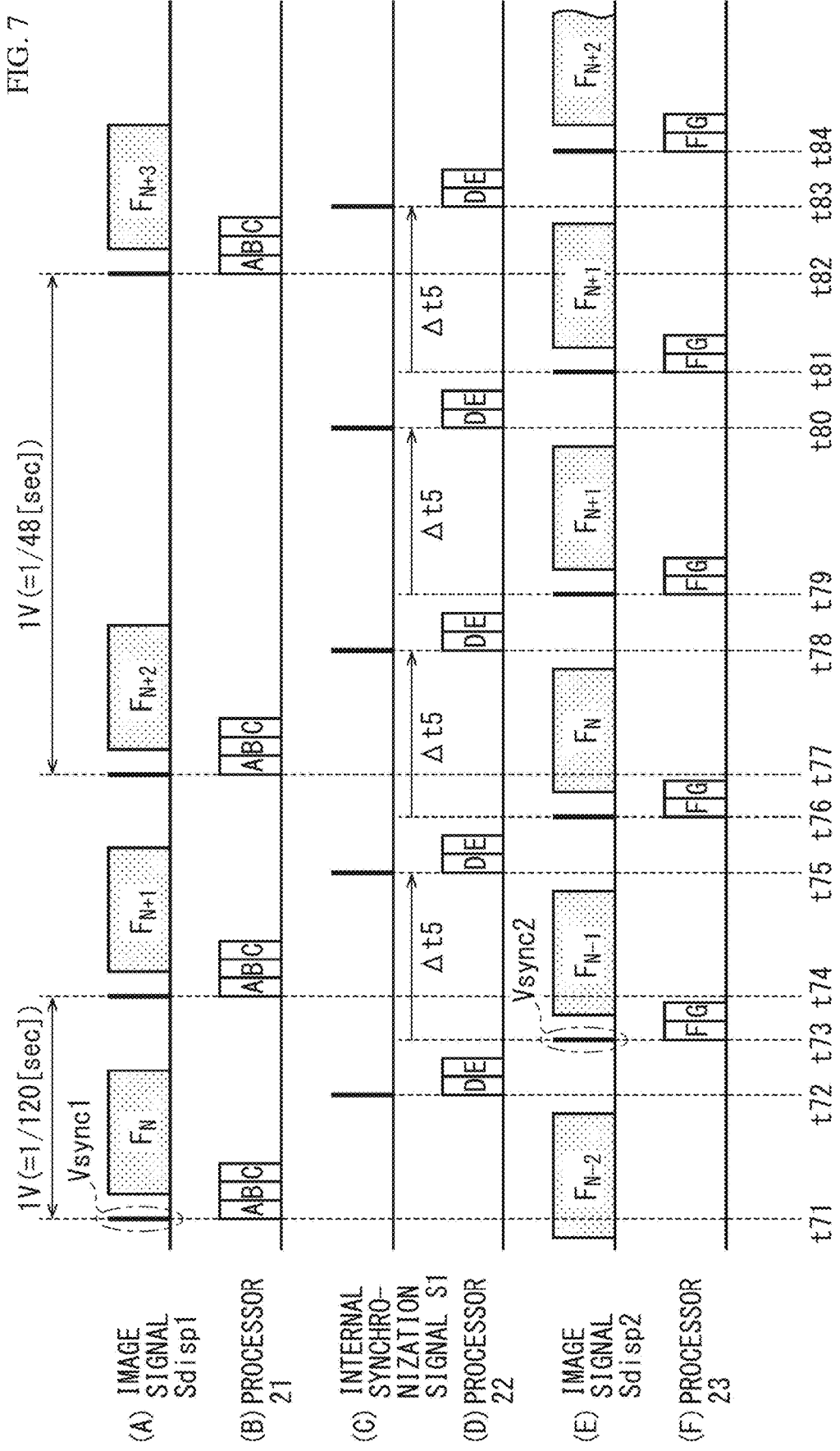

[FIG. 8]
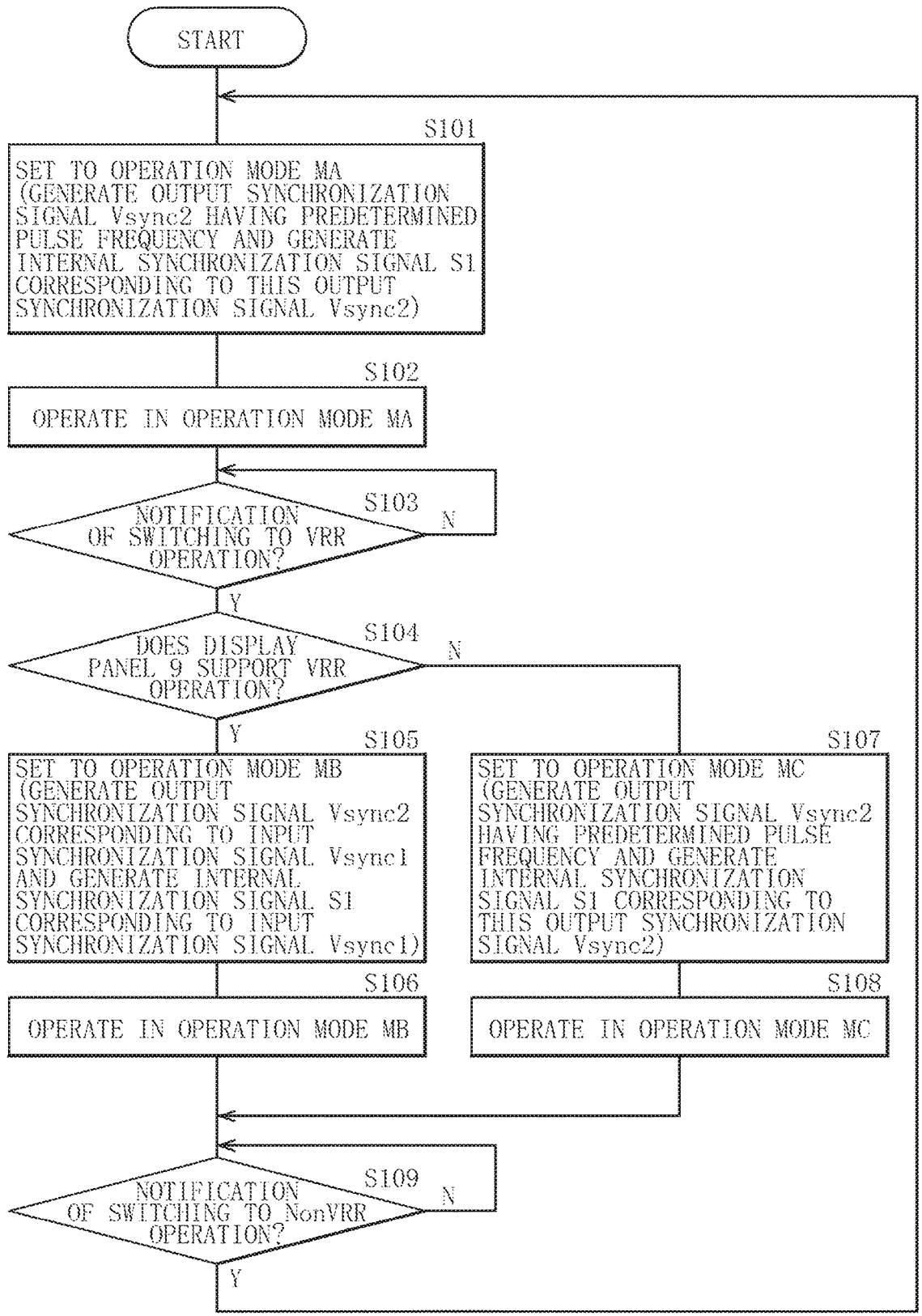

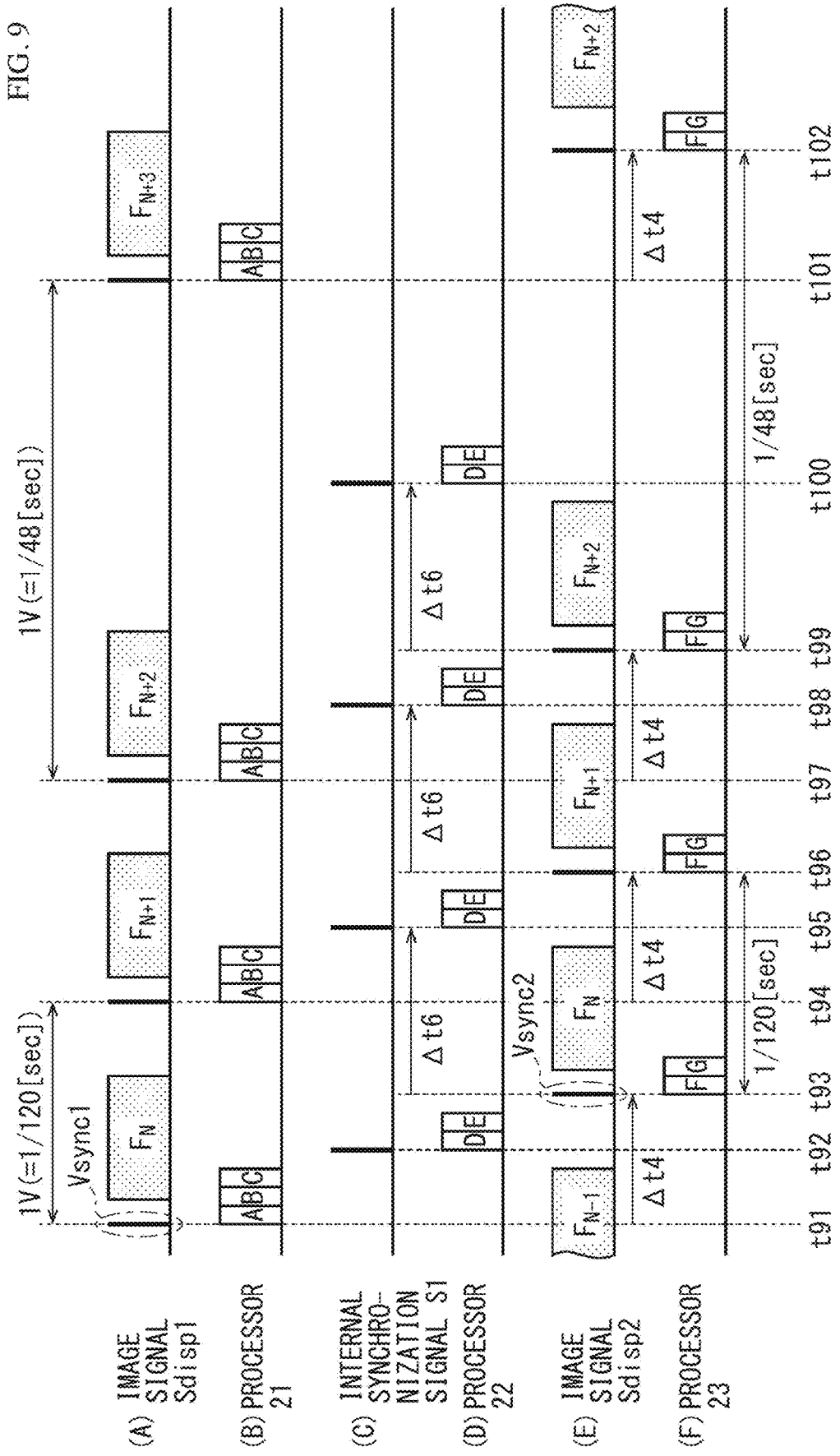

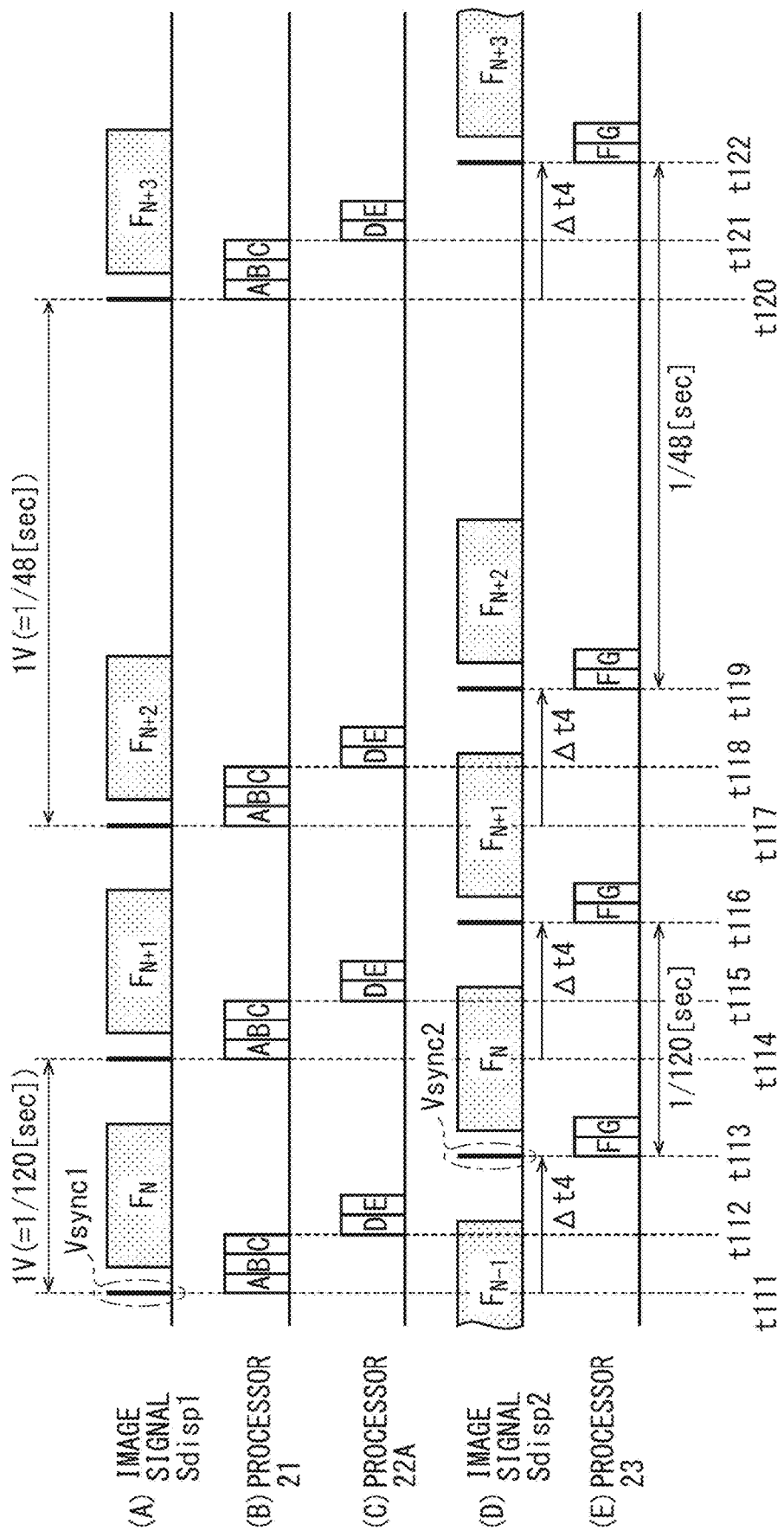

IMAGE PROCESSING DEVICE, IMAGE PROCESSING METHOD, AND IMAGE DISPLAY DEVICE

TECHNICAL FIELD

The present disclosure relates to an imaging processing device that performs processing on an image signal, an image processing method used in such an image processing device, and an image display device including such an image processing device.

BACKGROUND ART

In recent years, a variable frame rate (VRR; Variable Refresh rate) technology has been developed. In the variable frame rate technology, a frame rate is made dynamically variable. For example, PTL 1 discloses an image processing device that performs image processing on the basis of an image signal corresponding to such a variable frame rate.

CITATION LIST

Patent Literature

PTL 1: Japanese Unexamined Patent Application Publication No. 2019-184743

SUMMARY OF THE INVENTION

In an image display device, it is desired to suppress degradation in image quality due to, for example, repeat of the same frame image, skipping of a frame image, or the like in a case where display is performed on the basis of an image signal corresponding to a variable frame rate.

It is desirable to provide an image processing device, an image processing method, and an image display device that make it possible to suppress degradation in image quality.

An image processing device according to an embodiment of the present disclosure includes an input section, a first processor, a synchronization signal generator, a second processor, a controller, a third processor, and an output section. The input section is configured to receive an input image signal including an input synchronization signal and input image data. The first processor is configured to perform first processing on the basis of the input image data at a timing corresponding to the input synchronization signal. The synchronization signal generator is configured to generate an output synchronization signal. The second processor is configured to perform second processing on the basis of a processing result of the first processing at a timing corresponding to the input synchronization signal or a timing corresponding to the output synchronization signal. The controller is configured to control at which timing of the timing corresponding to the input synchronization signal and the timing corresponding to the output synchronization signal the second processor is to perform the second processing. The third processor is configured to perform third processing on the basis of a processing result of the second processing at a timing corresponding to the output synchronization signal to generate output image data. The output section is configured to output an output image signal including the output synchronization signal and the output image data.

An image processing method according to an embodiment of the present disclosure includes: an input section that receives an input image signal including an input synchronization signal and input image data; performing first processing on the basis of the input image data at a timing corresponding to the input synchronization signal; generating an output synchronization signal; performing second processing on the basis of a processing result of the first processing at a timing corresponding to the input synchronization signal or a timing corresponding to the output synchronization signal; controlling at which timing of the timing corresponding to the input synchronization signal and the timing corresponding to the output synchronization signal the second processing is to be performed; performing third processing on the basis of a processing result of the second processing at a timing corresponding to the output synchronization signal to generate output image data; and outputting an output image signal including the output synchronization signal and the output image data.

An image display device according to an image processing device and a display panel. The image processing device includes an input section, a first processor, a synchronization signal generator, a second processor, a controller, a third processor, and an output section. The input section is configured to receive an input image signal including an input synchronization signal and input image data. The first processor is configured to perform first processing on the basis of the input image data at a timing corresponding to the input synchronization signal. The synchronization signal generator is configured to generate an output synchronization signal. The second processor is configured to perform second processing on the basis of a processing result of the first processing at a timing corresponding to the input synchronization signal or a timing corresponding to the output synchronization signal. The controller is configured to control at which timing of the timing corresponding to the input synchronization signal and the timing corresponding to the output synchronization signal the second processor is to perform the second processing. The third processor is configured to perform third processing on the basis of a processing result of the second processing at a timing corresponding to the output synchronization signal to generate output image data. The output section is configured to output an output image signal including the output synchronization signal and the output image data. The display panel is configured to perform a display operation on the basis of an image signal processed by the image processing device.

In the image processing device, the image processing method, and the image display device according to the embodiments of the present disclosure, the input image signal including the input synchronization signal and the input image data is inputted. The first processing is performed on the basis of the input image data at the timing corresponding to the input synchronization signal. The second processing is performed on the basis of the processing result of the first processing. The timing at which the second processing is to be performed is controlled to be the timing corresponding the input synchronization signal or the timing corresponding to the output synchronization signal. The third processing is performed on the basis of the processing result of the second processing at the timing corresponding to the output synchronization signal. The output image data is generated by the third processing. The output image signal including the output synchronization signal and the output image data is then outputted.

BRIEF DESCRIPTION OF DRAWINGS

FIG. 3 is another timing chart illustrating an operation example in the first operation mode of the image processor illustrated in FIG. 1.

FIG. 4 is a timing chart illustrating an operation example in the first operation mode of the image processor illustrated in FIG. 1.

FIG. 5 is a timing chart illustrating an operation example in a second operation mode of the image processor illustrated in FIG. 1.

FIG. 6 is another timing chart illustrating an operation example in the second operation mode of the image processor illustrated in FIG. 1.

FIG. 7 is a timing chart illustrating an operation example in a third operation mode of the image processor illustrated in FIG. 1.

FIG. 8 is a flowchart illustrating an operation example of the image processor illustrated in FIG. 1.

FIG. 9 is a timing chart illustrating an operation example in the second operation mode of an image processor according to a comparative example.

FIG. 10 is a timing chart illustrating an operation example in the second operation mode of an image processor according to a modification example.

MODES FOR CARRYING OUT THE INVENTION

In the following, some embodiments of the present disclosure are described in detail with reference to the drawings.

EMBODIMENT

Configuration Example

Figure 1:
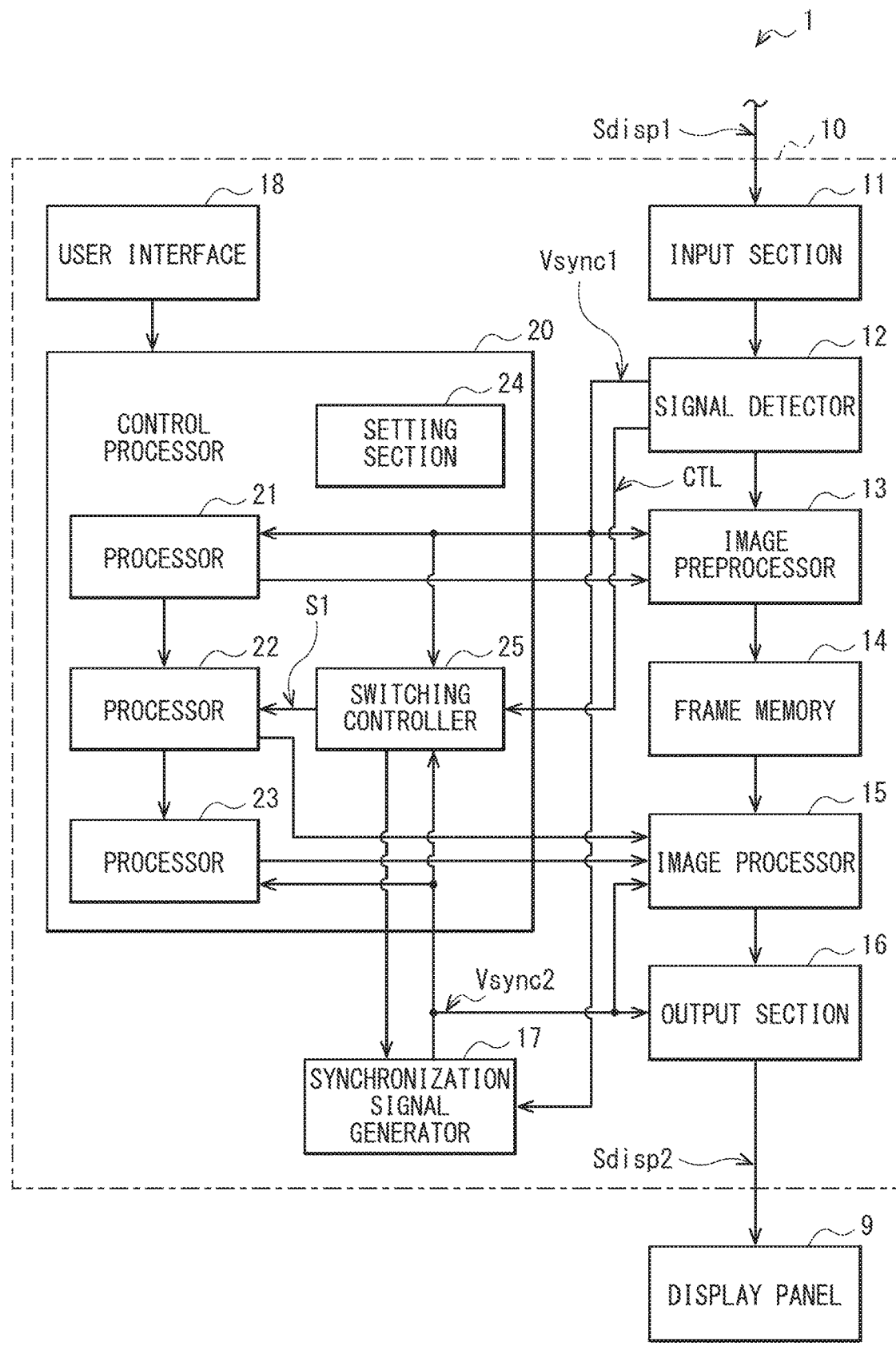
FIG. 1 is a block diagram illustrating a configuration example of an image display device according to an embodiment of the present disclosure.

FIG. 1 illustrates a configuration example of an image display device (image display device 1) according to an embodiment. The image display device 1 is configured to display an image on the basis of an image signal Sdisp1. The image display device 1 includes an image processor 10 and a display panel 9.

The image processor 10 is configured to generate an image signal Sdisp2 by performing predetermined image processing on the basis of the image signal Sdisp1 supplied from outside, and supply this image signal Sdisp2 to the display panel 9. The image processor 10 includes an input section 11, a signal detector 12, an image preprocessor 13, a frame memory 14, an image processor 15, an output section 16, a synchronization signal generator 17, a user interface 18, and a control processor 20.

The input section 11 is an input interface that receives the image signal Sdisp1 supplied from outside, and is configured to receive the image signal Sdisp1 compliant with the HDMI (registered trademark) 2.1 specification. The image signal Sdisp1 includes an input synchronization signal Vsync1, image data, and control data.

The signal detector 12 is configured to detect the input synchronization signal Vsync1, the image data, and the control data included in the image signal Sdisp1. The signal detector 12 supplies the detected input synchronization signal Vsync1 to the image preprocessor 13, the synchronization signal generator 17, and the control processor 20. The signal detector 12 supplies the detected image data to the image preprocessor 13. In addition, the signal detector 12 supplies control data CTL included in the detected control data to the control processor 20. The control data CTL provides notification of an operation (NonVRR operation) in which a frame rate does not vary or an operation (VRR operation) in which the frame rate is variable.

The image preprocessor 13 is configured to perform predetermined preprocessing on the image data supplied from the signal detector 12, on the basis of the input synchronization signal Vsync1. The image preprocessor 13 then writes the preprocessed image data to the frame memory 14 on the basis of an instruction from a processor 21 (to be described later).

The frame memory 14 is configured to store image data for several frames. The image data is written to the frame memory 14 by the image preprocessor 13, and the image data is read from the frame memory 14 by the image processor 15.

The image processor 15 is configured to read the image data from the frame memory 14 on the basis of an output synchronization signal Vsync2 and an instruction from a processor 22 (to be described later), and perform predetermined image processing on the thus-read image data on the basis of the output synchronization signal Vsync2 and an instruction from a processor 23 (to be described later). Examples of this image processing include IP (Interlace/Progressive) conversion, scaling processing for upscaling or downscaling an image, segmentation processing for segmenting an image, colorimetry processing for adjusting chromaticity, image quality control processing for adjusting image quality, and OSD superimposition processing for superimposing an OSD (On Screen Display) screen, and the like.

The output section 16 is configured to generate the image signal Sdisp2 on the basis of the output synchronization signal Vsync2 and the image data processed by the image processor 15. The image signal Sdisp2 includes the output synchronization signal Vsync2, the image data, and the control data. The output section 16 supplies the image signal Sdisp2 to the display panel 9.

The synchronization signal generator 17 is configured to generate the output synchronization signal Vsync2. The synchronization signal generator 17 is able to generate, for example, the output synchronization signal Vsync2 having a predetermined pulse frequency. In addition, the synchronization signal generator 17 is able to perform a phase adjustment operation to shift the phase of the output synchronization signal Vsync2 having the predetermined pulse frequency from the phase of the input synchronization signal Vsync1 by a predetermined amount. This phase adjustment operation is performed by increasing or decreasing the number of lines in a frame period. In addition, the synchronization signal generator 17 is able to generate the output synchronization signal Vsync2 corresponding to the input synchronization signal Vsync1 on the basis of the input synchronization signal Vsync1 by delaying this input synchronization signal Vsync1 for a predetermined time.

The user interface 18 is configured to receive an operation by a user.

The control processor 20 is configured to control an operation of the image processor 10 by controlling operations of respective blocks of the image processor 10. The control processor 20 includes, for example, a processor, a memory, and the like, and controls the operations of the respective bocks by executing various types of software. The control processor 20 includes the processors 21 to 23, a setting section 24, and a switching controller 25.

The processor 21 is configured to perform predetermined processing. Examples of the processing to be performed by the processor 21 include a task of determining an address where the image data is to be written to the frame memory 14. The processor 21 performs this processing at a timing corresponding to the input synchronization signal Vsync1. The processor 21 then supplies a result of this processing to the image preprocessor 13 and the processor 22.

The processor 22 is configured to perform predetermined processing on the basis of the result of the processing by the processor 21. Examples of the processing to be performed by the processor 22 include a task of determining an address where the image data is to be read from the image processor 15. The processor 22 performs this processing on the basis of an internal synchronization signal S1 generated by the switching controller 25. The processor 22 supplies a result of this processing to the image processor 15 and the processor 23.

The processor 23 is configured to perform predetermined processing on the basis of the result of the processing by the processor 22. Examples of the processing to be performed by the processor 23 include a task of determining image processing to be performed by the image processor 15. The processor 23 performs this processing at a timing corresponding to the output synchronization signal Vsync2. The processor 23 then supplies a result of this processing to the image processor 15.

The setting section 24 is configured to perform various types of setting of the image display device 1. Examples of the setting in the setting section 24 include setting of whether or not the display panel 9 supports the operation (VRR operation) in which the frame rate is variable.

The switching controller 25 is configured to determine at which timing of a timing corresponding to the input synchronization signal Vsync1 and a timing corresponding to the output synchronization signal Vsync2 the processor 22 is to perform the processing, on the basis of the control data CTL, and generate the internal synchronization signal S1 on the basis of a result of such determination. In addition, the switching controller 25 also performs processing for controlling an operation of the synchronization signal generator 17.

The display panel 9 is configured to perform a display operation on the basis of the image signal Sdisp2. The display panel 9 includes, for example, a liquid crystal display panel or an organic EL (Electro Luminescence) display panel.

Here, the input section 11 corresponds to a specific example of an "input section" in the present disclosure. The processor 21 and the image preprocessor 13 correspond to specific examples of a "first processor" in the present disclosure. The processor 22 corresponds to a specific example of a "second processor" in the present disclosure. The frame memory 14 corresponds to a specific example of a "frame memory" in the present disclosure. The processor 23 and the image processor 15 correspond to specific examples of a "third processor" in the present disclosure. The switching controller 25 corresponds to a specific example of a "switching controller" in the present disclosure. The synchronization signal generator 17 corresponds to a specific example of a "synchronization signal generator" in the present disclosure. The output section 16 corresponds to a specific example of an "output section" in the present disclosure. The setting section 24 corresponds to a specific example of a "setting section" in the present disclosure. The input synchronization signal Vsync1 corresponds to a specific example of an "input synchronization signal" in the present disclosure. The image signal Sdisp1 corresponds to a specific example of an "input image signal" in the present disclosure. The output synchronization signal Vsync2 corresponds to a specific example of an "output synchronization signal" in the present disclosure. The image signal Sdisp2 corresponds to a specific example of an "output image signal" in the present disclosure. The control data CTL corresponds to a specific example of "control data" in the present disclosure.

[Operation and Workings]

Next, description is given of an operation and workings of the image display device 1 according to the present embodiment.

(Overview of Overall Operation)

First, an overview of the overall operation of the image display device 1 is described with reference to FIG. 1. The input section 11 receives the image signal Sdisp1 supplied from outside. The signal detector 12 detects the input synchronization signal Vsync1, the image data, and the control data included in the image signal Sdisp1. The image preprocessor 13 performs predetermined preprocessing on the image data supplied from the signal detector 12 on the basis of the input synchronization signal Vsync1, and writes the preprocessed image data to the frame memory 14 on the basis of an instruction from the processor 21. The frame memory 14 stores image data for several frames written by the image preprocessor 13. The image processor 15 reads the image data from the frame memory 14 on the basis of the output synchronization signal Vsync2 and an instruction from the processor 22, and performs predetermined image processing on the thus-read image data on the basis of the output synchronization signal Vsync2 and an instruction from the processor 23. The output section 16 generates the image signal Sdisp2 on the basis of the output synchronization signal Vsync2 and the image data processed by the image processor 15, and supplies the generated image signal Sdisp2 to the display panel 9. The synchronization signal generator 17 generates the output synchronization signal Vsync2. The user interface 18 receives an operation by a user. The control processor 20 controls the operation of the image processor 10 by controlling the operations of the respective blocks of the image processor 10. The display panel 9 performs the display operation on the basis of the image signal Sdisp2.

(Detailed Operation)

Next, the operation of the image display device 1 is described in detail. The image processor 10 has three operation modes M (operation modes MA, MB, and MC). The operation mode MA is a mode used in a case where a frame rate of the inputted image signal Sdisp1 is fixed. The operation mode MB is a mode used in a case where the frame rate of the inputted image signal Sdisp1 is variable, and also a frame rate of the image signal Sdisp2 is varied similarly. The operation mode MC is a mode used in a case where the frame rate of the inputted image signal Sdisp1 is variable, and also the frame rate of the image signal Sdisp2 is fixed. The operations of the image processor 10 in the three operation modes M are described in detail below.

(Operation Mode MA)

First, description is given of the operation of the image processor 10 in the operation mode MA. The operation mode MA is a mode used in a case where the frame rate of the inputted image signal Sdisp1 is fixed. For example, in a case where the image signal Sdisp1 includes control data that provides notification of the operation (NonVRR operation) in which the frame rate does not vary, the image processor 10 operates in this operation mode MA.

Figure 2:
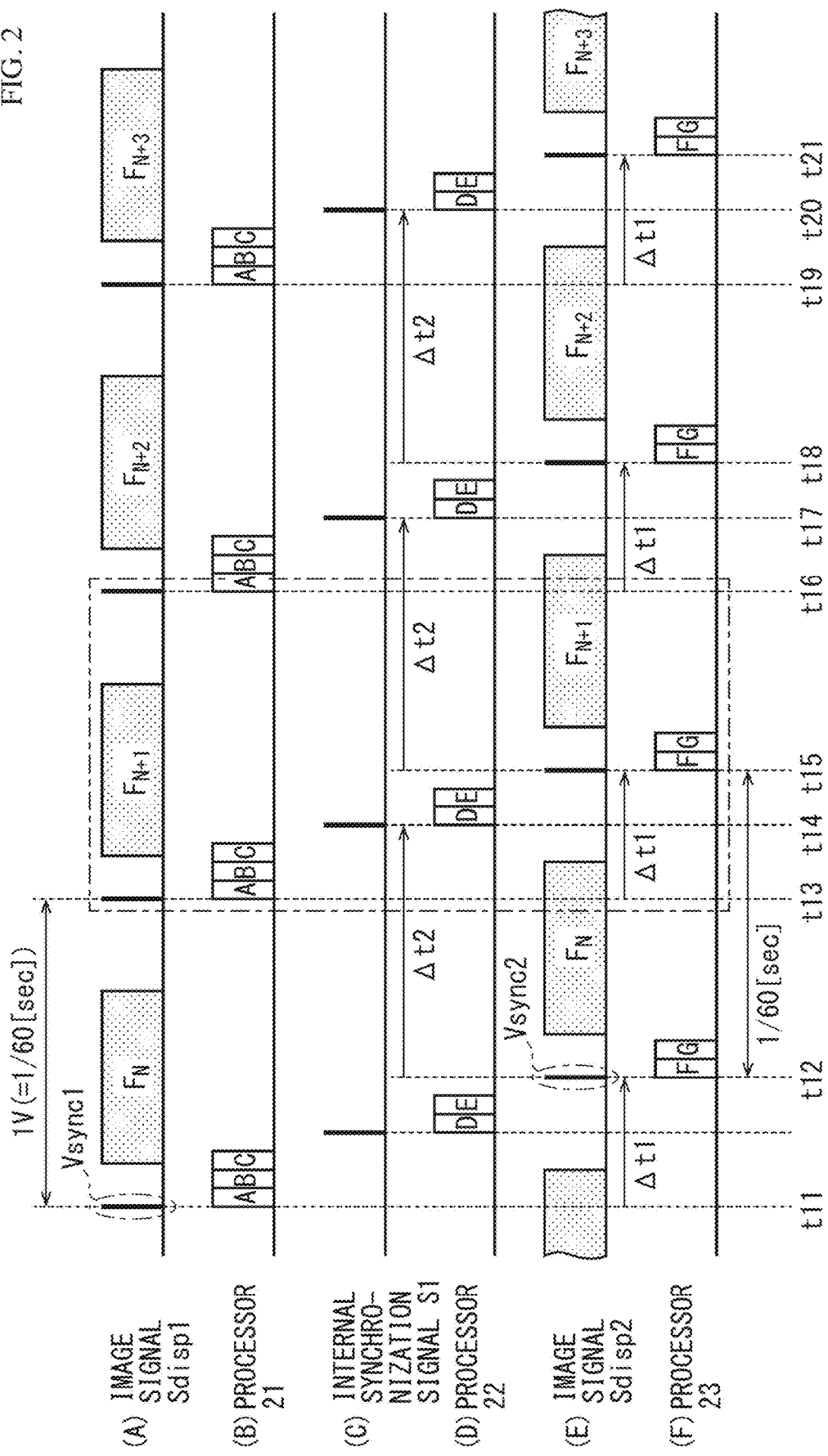
FIG. 2 is a timing chart illustrating an operation example in a first operation mode of an image processor illustrated in FIG. 1.

FIG. 2 illustrates an operation example of the image processor 10 in the operation mode MA, where (A) indicates the image signal Sdisp1, (B) indicates an operation of the processor 21, (C) indicates a waveform of the internal synchronization signal Ssync generated by the switching controller 25, (D) indicates an operation of the processor 22, (E) indicates the image signal Sdisp2, and (F) indicates an operation of the processor 23.

In this example, the frame rate of the image signal Sdisp1 is fixed at 60 Hz, and the frame rate of the image signal Sdisp2 is also fixed at 60 Hz. As illustrated in (A) of FIG. 2, the image signal Sdisp1 includes image data for a frame $F_N$ in a period from a timing t11 to a timing t13, includes image data for a frame $F_{N+1}$ in a period from the timing t13 to a timing t16, and includes image data for a frame $F_{N+2}$ in a period from the timing t16 to a timing t19.

The processor 21 performs predetermined processing on the basis of the input synchronization signal Vsync1 included in the image signal Sdisp1 ((B) of FIG. 2). In this example, the processing to be performed by the processor 21 is represented by "A", "B", and "C". Examples of the processing to be performed by the processor 21 include a task of determining an address where the image data is to be written to the frame memory 14. A result of this processing is latched by the image preprocessor 13 on the basis of a pulse of the next input synchronization signal Vsync1, and the image preprocessor 13 performs processing on the basis of thus-latched data. Specifically, for example, a processing result of the processing by the processor 21 starting from the timing t13 is latched by the image preprocessor 13 at the timing t16, and the image preprocessor 13 starts processing on the basis of thus-latched data at this timing t16.

In the operation mode MA, the switching controller 25 sets the processor 22 to operate at a timing corresponding to the output synchronization signal Vsync2, and controls the operation of the synchronization signal generator 17 to cause the synchronization signal generator 17 to generate the output synchronization signal Vsync2 having the predetermined pulse frequency.

In this example, the image processor 10 causes the frame rate of the image signal Sdisp2 to be the same as the frame rate of the image signal Sdisp1. The synchronization signal generator 17 generates the output synchronization signal Vsync2 having the predetermined pulse frequency (60 Hz in this example) ((E) of FIG. 2). In addition, the synchronization signal generator 17 performs a phase adjustment operation to shift the phase of the output synchronization signal Vsync2 from the phase of the input synchronization signal Vsync1 by a predetermined amount. Specifically, for example, the synchronization signal generator 17 performs the phase adjustment operation to generate a pulse of the output synchronization signal Vsync2 at a timing t12 at which a predetermined time Δt1 has elapsed from the timing t11 at which a pulse of the input synchronization signal Vsync1 is generated, thereby generating the output synchronization signal Vsync2.

In the operation mode MA, the switching controller 25 delays this output synchronization signal Vsync2 for a predetermined time Δt2 to generate the internal synchronization signal S1 ((C) of FIG. 2). Specifically, for example, the switching controller 25 generates the internal synchronization signal S1 to generate a pulse of the internal synchronization signal S1 at a timing t14 at which the predetermined time Δt2 has elapsed from the timing t12 at which the pulse of the output synchronization signal Vsync2 is generated. The processor 22 performs predetermined processing on the basis of this internal synchronization signal S1 ((D) of FIG. 2). In this example, the processing to be performed by the processor 22 is represented by "D" and "E". Examples of the processing to be performed by the processor 22 include a task of determining an address where image data is to be read from the image processor 15.

For example, this time Δt2 is set to cause the timing t14 at which the pulse of the internal synchronization signal S1 is generated to be later than a timing at which the processing ((B) of FIG. 2) by the processor 21 starting from the timing t13 ends. This makes it possible for the processor 22 to perform the processing after the processing by the processor 21 ends ((B) and (D) of FIG. 2).

A processing result by the processor 22 is latched by the image processor 15 on the basis of the output synchronization signal Vsync2 immediately after that. The image processor 15 performs processing on the basis of thus-latched data. Specifically, for example, a processing result of the processing by the processor 22 starting at the timing t14 is latched at a timing t15, and the image processor 15 starts the processing on the basis of thus-latched data at this timing t15.

The processor 23 then performs predetermined processing on the basis of the output synchronization signal Vsync2 ((F) of FIG. 2). In this example, the processing to be performed by the processor 23 is represented by "F" and "G". Examples of the processing to be performed by the processor 23 include a task of determining image processing to be performed by the image processor 15. A result of this processing is latched by the image processor 15 on the basis of the next output synchronization signal Vsync2. The image processor 15 performs processing on the basis of thus-latched data. Specifically, for example, a processing result of the processing by the processor 23 starting from the timing t15 is latched by the image processor 15 at a timing t18, and the image processor 15 starts the processing on the basis of thus-latched data at this timing t18.

Accordingly, for example, in the period from the timing t13 to the timing t16, the processor 21 starts the processing at the timing t13 ((B) of FIG. 2), the processor 22 starts the processing at the timing t14 after the processing by the processor 21 ends ((D) of FIG. 2), and the processor 23 starts the processing at the timing t15 after the processing by the processor 22 ends ((F) of FIG. 2).

Thus, the image processor 10 generates the image signal Sdisp2, and the output section 16 supplies this image signal Sdisp2 to the display panel 9. As illustrated in (E) of FIG. 2, the image signal Sdisp2 includes image data for the frame $F_N$ in a period from the timing t12 to the timing t15, includes image data for the frame $F_{N+1}$ in a period from the timing t15 to the timing t18, and includes image data for the frame $F_{N+2}$ in a period from the timing t18 to a timing t21.

FIG. 3 illustrates an operation of the image processor 10 from the timing t13 to the timing t16 illustrated in FIG. 2. As described above, the processor 21 first performs the processing ("A", "B", and "C"), thereafter, the processor 22 performs the processing ("D" and "E"), and thereafter, the processor 23 performs the processing ("F" and "G").

In this example, a standard processing time of the processor 21 is a time T1. For example, in a case where unexpected processing occurs, a timing at which the processing by the processor 21 ends may be delayed. A time Tα is provided as a margin to allow the processing by the processor 21 to end before the processing by the processor 22 starts even in a case where unexpected processing occurs in such a manner.

Likewise, in this example, a standard processing time of the processor 22 is a time T2. For example, in a case where unexpected processing occurs, a timing at which the processing by the processor 22 ends may be delayed. A time Tβ is provided as a margin to allow the processing by the processor 22 to end before the processing by the processor 23 starts even in a case where unexpected processing occurs in such a manner.

Minimizing the times Tα and Tβ makes it possible to shorten an input/output delay time (time Δt1) in the image processor 10. In the image processor 10, as illustrated in FIG. 3, it is possible to make this input/output delay time shorter than a time length corresponding to a period of the input synchronization signal Vsync1. As a result, in the image display device 1, it is possible to shorten a time from inputting data of a frame image to displaying the frame image.

FIG. 4 illustrates another operation example of the image processor 10 in the operation mode MA. In this example, the frame rate of the image signal Sdisp1 is fixed at 48 Hz, and the frame rate of the image signal Sdisp2 is fixed at 60 Hz. In other words, while the frame rates of the image signals Sdisp1 and Sdisp2 are equal to each other in the example in FIG. 2, the frame rates of the image signals Sdisp1 and Sdisp2 are different from each other in an example in FIG. 4. As illustrated in (A) of FIG. 4, the image signal Sdisp1 includes image data for the frame $F_N$ in a period from a timing t31 to a timing t34, includes image data for the frame $F_{N+1}$ in a period from the timing t34 to a timing t39, and includes image data for the frame $F_{N+2}$ in a period from the timing t39 to a timing t42.

The processor 21 performs predetermined processing on the basis of the input synchronization signal Vsync1 included in the image signal Sdisp1 ((B) of FIG. 4). A result of this processing is latched by the image preprocessor 13 on the basis of a pulse of the next input synchronization signal Vsync1, and the image preprocessor 13 performs processing on the basis of thus-latched data.

In the operation mode MA, as described above, the switching controller 25 sets the processor 22 to operate at a timing corresponding to the output synchronization signal Vsync2, and controls the operation of the synchronization signal generator 17 to cause the synchronization signal generator 17 to generate the output synchronization signal Vsync2 having the predetermined pulse frequency.

In this example, the image processor 10 maintains the frame rate of the image signal Sdisp2 at a frame rate different from the frame rate of the image signal Sdisp1. The synchronization signal generator 17 generates the output synchronization signal Vsync2 having the predetermined pulse frequency (60 Hz in this example) ((E) of FIG. 4). In other words, in this example, the output synchronization signal Vsync2 is not synchronized with the input synchronization signal Vsync1. This pulse frequency corresponds to the frame rate of the image signal Sdisp2. The synchronization signal generator 17 generates the output synchronization signal Vsync2 including pulses at timings t33, t35, t37, and t40 in this example.

In the operation mode MA, the switching controller 25 delays this output synchronization signal Vsync2 for the predetermined time Δt2 to generate the internal synchronization signal S1 ((C) of FIG. 4). The processor 22 then performs predetermined processing on the basis of this internal synchronization signal S1 ((D) of FIG. 4). A processing result of the processing by the processor 22 is latched by the image processor 15 on the basis of the output synchronization signal Vsync2 immediately after that. The image processor 15 performs processing on the basis of thus-latched data.

The processor 23 then performs predetermined processing on the basis of the output synchronization signal Vsync2 ((F) of FIG. 4). A result of this processing is latched by the image processor 15 on the basis of the next output synchronization signal Vsync2. The image processor 15 performs processing on the basis of thus-latched data. Specifically, for example, a processing result of the processing by the processor 23 starting at a timing t36 is latched by the image processor 15 at a timing t38, and the image processor 15 starts the processing on the basis of thus-latched data at this timing t38.

Thus, the image processor 10 generates the image signal Sdisp2, and the output section 16 supplies this image signal Sdisp2 to the display panel 9. As illustrated in (E) of FIG. 4, the image signal Sdisp2 includes image data for a frame $F_{N-1}$ in a period from the timing t33 to the timing t36, includes image data for the frame $F_N$ in a period from the timing t38 to a timing t41, and includes image data for the frame $F_{N+1}$ in a period from the timing t41 onward.

The image processor 10 outputs image data for the latest frame F on which writing processing to the frame memory 14 is completed. Specifically, in other words, at a start timing of the period from the timing t33 to the timing t36, a period until the timing t31 in which image data for a frame FN−1 is written has ended, but the period from the timing t31 to the timing t34 in which image data for the frame $F_N$ is written has not ended. Accordingly, the image processor 10 outputs the image data for the frame $F_{N-1}$. In addition, at a start timing of the period from the timing t36 to the timing t38, a period from the timing t31 to the timing t34 in which the image data for the frame $F_N$ is written has ended, but a period from the timing t34 to the timing t39 in which the image data for the frame $F_{N+1}$ is written has not ended. Accordingly, the image processor 10 outputs the image data for the frame $F_N$. At a start timing of the period from the timing t38 to a timing t41, a period from the timing t34 to the timing t39 in which the image data for the frame $F_{N+1}$ is written has not ended; therefore, the image processor 10 outputs the image data for the frame $F_N$. At a start timing of the period from the timing t41 onward, a period from the timing t34 to the timing t39 in which the image data for the frame $F_{N+1}$ is written has ended, but a period from the timing t39 to the timing t42 in which the image data for the frame $F_{N+2}$ is written has not ended; therefore, the image processor 10 outputs the image data for the frame $F_{N+1}$.

Thus, in the operation mode MA, the processor 22 operates at a timing corresponding to the output synchronization signal Vsync2. Accordingly, image data is written to the frame memory 14 at a timing corresponding to the input synchronization signal Vsync1, and image data is read from the frame memory 14 at a timing corresponding to the output synchronization signal Vsync2. The frame memory 14 operates as a so-called buffer memory in such a manner, which makes it possible for the image processor 10 to generate a desired image signal Sdisp2 corresponding to the image signal Sdisp1 irrespective of whether the pulse frequency of the input synchronization signal Vsync1 and the pulse frequency of the output synchronization signal Vsync2 are the same as or different from each other.

(Operation Mode MB)

Next, description is given of the operation of the image processor 10 in the operation mode MB. The operation mode MB is a mode used in a case where the frame rate of the inputted image signal Sdisp1 is variable, and also the frame rate of the image signal Sdisp2 is varied similarly. For example, in a case where the display panel 9 supports the VRR operation, for example, on condition that the image signal Sdisp1 includes control data that provides notification of the operation (VRR operation) in which the frame rate is variable, the image processor 10 operates in the operation mode MB.

FIG. 5 illustrates an operation example of the image processor 10 in the operation mode MB. In this example, the frame rate of the image signal Sdisp1 varies from 120 Hz to 48 Hz at a timing t57, and the frame rate of the image signal Sdisp2 also varies from 120 Hz to 48 Hz at a timing t59 in response to this variation. As illustrated in (A) of FIG. 5, the image signal Sdisp1 includes image data for the frame $F_N$ in a period from a timing t51 to a timing t54, includes image data for the frame $F_{N+1}$ in a period from the timing t54 to the timing t57, and includes image data for the frame $F_{N+2}$ in a period from the timing t57 to a timing t60.

The processor 21 performs predetermined processing on the basis of the input synchronization signal Vsync1 included in the image signal Sdisp1 ((B) of FIG. 5). A result of this processing is latched by the image preprocessor 13 on the basis of a pulse of the next input synchronization signal Vsync1, and the image preprocessor 13 performs processing on the basis of thus-latched data.

In the operation mode MB, the switching controller 25 sets the processor 22 to operate at a timing corresponding to the input synchronization signal Vsync1, and controls the operation of the synchronization signal generator 17 to cause the synchronization signal generator 17 to generate the output synchronization signal Vsync2 corresponding to the input synchronization signal Vsync1.

The switching controller 25 delays the input synchronization signal Vsync1 for a predetermined time Δt3 to generate the internal synchronization signal S1 ((C) of FIG. 5). Specifically, for example, the switching controller 25 generates the internal synchronization signal S1 to generate a pulse of the internal synchronization signal S1 at a timing t55 at which the predetermined time Δt3 has elapsed from the timing t54 at which the pulse of the input synchronization signal Vsync1 is generated. Likewise, the switching controller 25 generates the internal synchronization signal S1 to generate a pulse of the internal synchronization signal S1 at a timing t58 at which the predetermined time Δt3 has elapsed from the timing t57 at which the pulse of the input synchronization signal Vsync1 is generated. The processor 22 then performs predetermined processing on the basis of this internal synchronization signal S1 ((D) of FIG. 5).

For example, this time Δt3 is set to cause the timing t55 at which the pulse of the internal synchronization signal S1 is generated to be later than a timing at which the processing ((B) of FIG. 5) by the processor 21 starting from the timing t54 ends. This makes it possible for the processor 22 to perform the processing after the processing by the processor 21 ends ((B) and (D) of FIG. 5).

A processing result of the processing by the processor 22 is latched by the image processor 15 on the basis of the output synchronization signal Vsync2 immediately after that. The image processor 15 performs processing on the basis of thus-latched data.

The synchronization signal generator 17 delays the input synchronization signal Vsync1 for a predetermined time Δt4 to generate the output synchronization signal Vsync2 ((E) of FIG. 5). Specifically, for example, the synchronization signal generator 17 generates the output synchronization signal Vsync2 to generate a pulse of the output synchronization signal Vsync2 at a timing t56 at which the predetermined time Δt4 has elapsed from the timing t54 at which the pulse of the input synchronization signal Vsync1 is generated. Likewise, for example, the synchronization signal generator 17 generates the output synchronization signal Vsync2 to generate a pulse of the output synchronization signal Vsync2 at the timing t59 at which the predetermined time Δt4 has elapsed from the timing t57 at which the pulse of the input synchronization signal Vsync1 is generated. The processor 23 then performs predetermined processing on the basis of this output synchronization signal Vsync2 ((F) of FIG. 5).

For example, this time Δt4 is set to cause the timing t56 at which the pulse of the output synchronization signal Vsync2 is generated to be later than a timing at which the processing ((D) of FIG. 5) by the processor 22 starting from the timing t55 ends. This makes it possible for the processor 23 to perform processing after the processing by the processor 22 ends ((D) and (F) of FIG. 5).

A processing result by the processor 23 is latched by the image processor 15 on the basis of the next output synchronization signal Vsync2. The image processor 15 performs processing on the basis of thus-latched data.

Accordingly, for example, in the period from the timing t54 to the timing t57, the processor 21 starts the processing at the timing t54 ((B) of FIG. 5), the processor 22 starts the processing at the timing t55 after the processing by the processor 21 ends ((D) of FIG. 5), and the processor 23 starts the processing at the timing t56 after the processing by the processor 22 ends ((F) of FIG. 5). Likewise, in the period from the timing t57 to the timing t60, the processor 21 starts the processing at the timing t57 ((B) of FIG. 5), the processor 22 starts the processing at the timing t58 after the processing by the processor 21 ends ((D) of FIG. 5), and the processor 23 starts the processing at the timing t59 after the processing by the processor 22 ends ((F) of FIG. 5).

Thus, the image processor 10 generates the image signal Sdisp2, and the output section 16 supplies the image signal Sdisp2 to the display panel 9. As illustrated in (E) of FIG. 5, the image signal Sdisp2 includes image data for the frame $F_N$ in a period from a timing t53 to the timing t56, includes image data for the frame $F_{N+1}$ in a period from the timing t56 to the timing t59, and includes image data for the frame $F_{N+2}$ in a period from the timing t59 to a timing t62.

FIG. 6 illustrates an operation of the image processor 10 from the timing t54 to the timing t57 illustrated in FIG. 5. As described above, the processor 21 first performs the processing ("A", "B", and "C"), thereafter, the processor 22 performs the processing ("D" and "E"), and thereafter, the processor 23 performs the processing ("F" and "G"). Even in this example, as in the operation mode MA (FIG. 3), minimizing the times Tα and Tβ makes it possible to shorten an input/output delay time (time Δt4) in the image processor 10. Specifically, in the image processor 10, as illustrated in FIG. 6, even in a case where the frame rate varies, it is possible to make this input/output delay time shorter than a time length corresponding to the period of the input synchronization signal Vsync1. As a result, in the image display device 1, even in a case where the frame rate varies, it is possible to shorten a time from inputting data of a frame image to displaying the frame image.

(Operation Mode MC)

Next, description is given of the operation of the image processor 10 in the operation mode MC. The operation mode MC is a mode used in a case where the frame rate of the inputted image signal Sdisp1 is variable, and also the frame rate of the image signal Sdisp2 is fixed. For example, in a case where the display panel 9 does not support the VRR operation on condition that the image signal Sdisp1 includes control data that provides notification of the operation (VRR operation) in which the frame rate is variable, the image processor 10 operates in this operation mode MC.

FIG. 7 illustrates an operation example of the image processor 10 in the operation mode MC. In this example, the frame rate of the image signal Sdisp1 varies from 120 Hz to 48 Hz at a timing t77. Meanwhile, the frame rate of the image signal Sdisp2 is maintained at 120 Hz. As illustrated in (A) of FIG. 7, the image signal Sdisp1 includes image data for the frame $F_N$ in a period from a timing t71 to a timing t74, includes image data for the frame $F_{N+1}$ in a period from the timing t74 to the timing t77, and includes image data for the frame $F_{N+2}$ in a period from the timing t77 to a timing t82.

The processor 21 performs predetermined processing on the basis of the input synchronization signal Vsync1 included in the image signal Sdisp1 ((B) of FIG. 7). A result of this processing is latched by the image preprocessor 13 on the basis of the next input synchronization signal Vsync1, and the image preprocessor 13 performs processing on the basis of thus-latched data.

In the operation mode MC, the switching controller 25 sets the processor 22 to operate at a timing corresponding to the output synchronization signal Vsync2, and controls the operation of the synchronization signal generator 17 to cause the synchronization signal generator 17 to generate the output synchronization signal Vsync2 having a predetermined pulse frequency.

In this example, the image processor 10 maintains the frame rate of the image signal Sdisp2 at a predetermined frame rate (120 Hz in this example). The synchronization signal generator 17 generates the output synchronization signal Vsync2 having the predetermined pulse frequency (120 Hz in this example) ((E) of FIG. 7). In other words, in this example, the output synchronization signal Vsync2 is not synchronized with the input synchronization signal Vsync1. This pulse frequency corresponds to the frame rate of the image signal Sdisp2. In this example, the synchronization signal generator 17 generates the output synchronization signal Vsync2 including pulses at timings t73, t76, t79, t81, and t84.

In the operation mode MC, the switching controller 25 delays the output synchronization signal Vsync2 for a predetermined time Δt5 to generate the internal synchronization signal S1 ((C) of FIG. 7). The processor 22 then performs predetermined processing on the basis of this internal synchronization signal S1 ((D) of FIG. 7). A processing result of the processing by the processor 22 is latched by the image processor 15 on the basis of the output synchronization signal Vsync2 immediately after that. The image processor 15 performs processing on the basis of thus-latched data.

The processor 23 then performs predetermined processing on the basis of the output synchronization signal Vsync2 ((F) of FIG. 7). A result of this processing is latched by the image processor 15 on the basis of the next output synchronization signal Vsync2. The image processor 15 performs processing on the basis of thus-latched data. Specifically, for example, a processing result of the processing by the processor 23 starting at the timing t76 is latched by the image processor 15 at the timing t79, and the image processor 15 starts the processing on the basis of thus-latched data at this timing t79.

Thus, the image processor 10 generates the image signal Sdisp2, and the output section 16 supplies this image signal Sdisp2 to the display panel 9. As illustrated in (E) of FIG. 7, the image signal Sdisp2 includes image data for a frame $F_{N-1}$ in a period from the timing t73 to the timing t76, includes image data for the frame $F_N$ in a period from the timing t76 to the timing t79, includes image data for frame $F_{N+1}$ in a period from the timing t79 to the timing t81 and a period from the timing t81 to the timing t84, and includes image data for frame $F_{N+2}$ in a period from the timing t84 onward.

Thus, in the image display device 1, for example, in a case where the display panel 9 does not support the VRR operation, it is possible to maintain the frame rate of the image signal Sdisp2 at a predetermined frame rate even if the image signal Sdisp1 having a varying frame rate is supplied.

(Setting of Operation Mode M)

The image processor 10 operates in such operation modes MA to MC. The switching controller 25 sets the operation mode M on the basis of the control data CTL. An operation of setting the operation mode M is described in detail below.

FIG. 8 illustrates an operation example of the image processor 10. The image processor 10 sets the operation mode to the operation mode MB or the operation mode MC on the basis of notification of switching from the NonVRR operation to the VRR operation, and sets the operation mode to the operation mode MA on the basis of notification of switching from the VRR operation to the NonVRR operation. This operation is described in detail below.

The switching controller 25 first performs the operation (NonVRR operation) in which the frame rate does not vary; therefore, the operation mode M is set to the operation mode MA (step S101).

Accordingly, the synchronization signal generator 17 generates the output synchronization signal Vsync2 having the predetermined pulse frequency. For example, as illustrated in FIG. 2, in a case where the frame rates of the image signals Sdisp1 and Sdisp2 are the same as each other, the synchronization signal generator 17 generates the output synchronization signal Vsync2 having the predetermined pulse frequency, and performs a phase adjustment operation to shift the phase of the output synchronization signal Vsync2 from the phase of the input synchronization signal Vsync1 by a predetermined amount. In addition, for example, as illustrated in FIG. 4, in a case where the frame rates of the image signals Sdisp1 and Sdisp2 are different from each other, the synchronization signal generator 17 generates the output synchronization signal Vsync2 having the predetermined pulse frequency.

In addition, the switching controller 25 generates the internal synchronization signal S1 corresponding to the output synchronization signal Vsync2. Accordingly, the processor 22 performs the processing at a timing corresponding to the output synchronization signal Vsync2.

The image processor 10 then operates in the operation mode MA (step S102).

Next, the switching controller 25 confirms whether or not notification of switching to the operation (VRR operation) in which the frame rate is variable has been received, on the basis of the control data CTL (step S103). In a case where the notification of switching to the VRR operation has not been received ("N" in step S103), this processing in step S103 is repeated until receiving the notification of switching to the VRR operation.

In step S103, in a case where the notification of switching to the VRR operation has been received ("Y" in step S103), the switching controller 25 confirms whether or not the display panel 9 supports the VRR operation, on the basis of setting in the setting section 24 (step S104).

In step S104, in a case where the display panel 9 supports the VRR operation ("Y" in step S104), the switching controller 25 sets the operation mode M to the operation mode MB (step S105).

Accordingly, as illustrated in FIG. 5, the synchronization signal generator 17 generates the output synchronization signal Vsync2 corresponding to the input synchronization signal Vsync1. In addition, the switching controller 25 generates the internal synchronization signal S1 corresponding to the input synchronization signal Vsync1. Accordingly, the processor 22 performs the processing at a timing corresponding to the input synchronization signal Vsync1.

The image processor 10 then operates in the operation mode MB (step S106).

In step S104, in a case where the display panel 9 does not support the VRR operation ("N" in step S104), the switching controller 25 sets the operation mode M to the operation mode MC (step S107).

Accordingly, as illustrated in FIG. 7, the synchronization signal generator 17 generates the output synchronization signal Vsync2 having the predetermined pulse frequency. In addition, the switching controller 25 generates the internal synchronization signal S1 corresponding to the output synchronization signal Vsync2. Accordingly, the processor 22 performs the processing at a timing corresponding to the output synchronization signal Vsync2.

The image processor 10 then operates in the operation mode MC (step S108).

Next, the switching controller 25 confirms whether or not notification of switching to the operation (NonVRR operation) in which the frame rate does not vary has been received, on the basis of the control data CTL (step S109). In a case where the notification of switching to the NonVRR operation has not been received ("N" in step S109), this processing in step S109 is repeated until receiving the notification of switching to the NonVRR operation. In a case where the notification of switching to the NonVRR operation has been received ("Y" in step S109), the operation returns to the processing in step S101.

Here, the operation mode MA corresponds to a specific example of a "first operation mode" in the present disclosure. The operation mode MB corresponds to a specific example of a "second operation mode" in the present disclosure. The operation mode MC corresponds to a specific example of a "third operation mode" in the present disclosure.

Comparative Example

Next, description is given of an image display device 1R according to a comparative example. The image display device 1R is configured to cause the processor 22 to perform processing at a timing corresponding to the output synchronization signal Vsync2 in the operation mode MB. In other words, while, in the image display device 1 according to the present embodiment, the processor 22 performs the processing at a timing corresponding to the input synchronization signal Vsync1 in the operation mode MB, in the image display device 1R according to the present comparative example, the processor 22 performs the processing at a timing corresponding to the output synchronization signal Vsync2 in the operation mode MB. This image display device 1R includes an image processor 10R, as with the image display device 1 (FIG. 1) according to the present embodiment. The image processor 10R includes a switching controller 25R, as with the image processor 10 (FIG. 1) according to the present embodiment.

FIG. 9 illustrates an operation example of the image processor 10R in the operation mode MB. FIG. 9 corresponds to FIG. 5 according to the present embodiment. In this example, the frame rate of the image signal Sdisp1 varies from 120 Hz to 48 Hz at a timing t97, and the frame rate of the image signal Sdisp2 also varies from 120 Hz to 48 Hz at a timing t99 in response to this variation. As illustrated in (A) of FIG. 9, the image signal Sdisp1 includes image data for the frame $F_N$ in a period from a timing t91 to a timing t94, includes image data for the frame $F_{N+1}$ in a period from the timing t94 to the timing t97, and includes image data for the frame $F_{N+2}$ in a period from the timing t97 to a timing 101.

The processor 21 performs predetermined processing on the basis of the input synchronization signal Vsync1 included in the image signal Sdisp1 ((B) of FIG. 9). A result of this processing is latched by the image preprocessor 13 on the basis of a pulse of the next input synchronization signal Vsync1, and the image preprocessor 13 performs processing on the basis of thus-latched data.

In the operation mode MB according to the comparative example, the switching controller 25R sets the processor 22 to operate at a timing corresponding to the output synchronization signal Vsync2, and controls the operation of the synchronization signal generator 17 to cause the synchronization signal generator 17 to generate the output synchronization signal Vsync2 corresponding to the input synchronization signal Vsync1.

The synchronization signal generator 17 delays the input synchronization signal Vsync1 for the predetermined time $\Delta t4$ to generate the output synchronization signal Vsync2 ((E) of FIG. 9).

The switching controller 25R delays this output synchronization signal Vsync2 for a predetermined time $\Delta t6$ to generate the internal synchronization signal S1 ((C) of FIG. 9). The processor 22 performs predetermined processing on the basis of this internal synchronization signal S1 ((D) of FIG. 9).

For example, this time $\Delta t6$ is set to cause a timing t95 at which the pulse of the internal synchronization signal S1 is generated to be later than a timing at which the processing ((B) of FIG. 9) by the processor 21 starting from the timing t94 ends. This makes it possible for the processor 22 to perform the processing after the processing by the processor 21 ends ((B) and (D) of FIG. 9).

A processing result by the processor 22 is latched by the image processor 15 on the basis of the output synchronization signal Vsync2 immediately after that. The image processor 15 performs processing on the basis of thus-latched data.

The processor 23 then performs predetermined processing on the basis of the output synchronization signal Vsync2 ((F) of FIG. 9). A result of this processing is latched by the image processor 15 on the basis of the next output synchronization signal Vsync2. The image processor 15 performs processing on the basis of thus-latched data.

For example, in a period from the timing t94 to the timing t97, the processor 21 starts the processing at the timing t94 ((B) of FIG. 9), the processor 22 starts the processing at the timing t95 after the processing by the processor 21 ends ((D) of FIG. 9), and the processor 23 starts the processing at a timing t96 after the processing by the processor 22 ends ((F) of FIG. 9). Likewise, in a period from the timing t97 to a timing t101, the processor 21 starts the processing at the timing t97 ((B) of FIG. 9), the processor 22 starts the processing at a timing t98 after the processing by the processor 21 ends ((D) of FIG. 9), and the processor 23 starts the processing at the timing t99 after the processing by the processor 22 ends ((F) of FIG. 9).

In the image display device 1R according to this comparative example, the switching controller 25R generates the internal synchronization signal S1 to generate a pulse of the internal synchronization signal S1 at a timing t100 at which the predetermined time Δt6 has elapsed from this timing t99 ((C) of FIG. 9). The processor 22 performs predetermined processing on the basis of this internal synchronization signal S1 ((D) of FIG. 9). In addition, the synchronization signal generator 17 generates the output synchronization signal Vsync2 to generate a pulse of the output synchronization signal Vsync2 at a timing t102 at which the predetermined time Δt4 has elapsed from the timing t101 at which the pulse of the input synchronization signal Vsync1 is generated ((E) of FIG. 9). Accordingly, a processing result by the processor 22 starting from the timing t100 is latched by the image processor 15 at the timing t102. Thus, in a period from the timing t102 onward, the image signal Sdisp2 includes image data for the frame $F_{N+2}$.

Thus, as illustrated in (E) of FIG. 9, the image signal Sdisp2 includes the image data for the frame $F_{N+2}$ in a period from the timing t99 to the timing t102 and the period from the timing t102 onward. In other words, in the image display device 1R, the same frame image is repeated. It is to be noted that, in this example, the frame rate of the image signal Sdisp1 varies from 120 Hz to 48 Hz, however, for example, in a case where the frame rate of the image signal Sdisp1 varies from 48 Hz to 120 Hz, there is a possibility that the frame image is skipped.

As described above, in the image display device 1R according to the comparative example, there is a possibility that the frame image is repeated or the frame image is skipped. In this case, degradation in image quality occurs.

Meanwhile, in the image display device 1 according to the present embodiment, as illustrated in FIG. 5, it is possible to reduce the possibility that the frame image is repeated or the frame image is skipped. This makes it possible to suppress degradation in image quality in the image display device 1.

As described above, in the image display device 1, the processor 22 (second processor) and the switching controller 25 are provided. The processor 22 performs processing at a timing corresponding to the input synchronization signal Vsync1 or a timing corresponding to the output synchronization signal Vsync2 on the basis of a result of processing by the processor 21 and the image preprocessor 13 (first processor). The switching controller 25 controls at which timing of the timing corresponding to the input synchronization signal Vsync1 and the timing corresponding to the output synchronization signal Vsync2 the processor 22 is to perform the processing. Accordingly, for example, the switching controller 25 sets the processor 22 to perform the processing at the timing corresponding to the output synchronization signal Vsync2 in the operation (NonVRR operation) in which the frame rate does not vary and perform the processing at the timing corresponding to the input synchronization signal Vsync1 in the operation (VRR operation) in which the frame rate is variable. Accordingly, in the image display device 1, it is possible to reduce the possibility that the frame image is repeated or the frame image is skipped in the VRR operation, which makes it possible to suppress degradation in image quality.

In addition, for example, as illustrated in FIG. 6, in the image display device 1, a delay time between a timing at which the image signal Sdisp1 is inputted to the input section 11 and a timing at which the image signal Sdisp2 is outputted from the output section 16 is made shorter than a time of one period of the input synchronization signal Vsync1, which makes it possible to suppress degradation in image quality while shortening a time until displaying, for example, in a case where the frame rate varies.

[Effects]

As described above, in the present embodiment, the second processor and the switching controller are provided. The second processor performs processing at a timing corresponding to the input synchronization signal or a timing corresponding to the output synchronization signal on the basis of a processing result by the first processor, and the switching controller controls at which timing of the timing corresponding to the input synchronization signal and the timing corresponding to the output synchronization signal the second processor is to perform the processing. This makes it possible to reduce degradation in image quality.

In the present embodiment, a delay time between a timing at which the image signal is inputted to the input section and a timing at which the image signal is outputted from the output section is made shorter than a time of one period of the input synchronization signal, which makes it possible to suppress degradation in image quality while shortening a time until displaying.

Modification Example 1

In the embodiment described above, the processor 22 performs the processing at a timing corresponding to the internal synchronization signal S1 generated by the switching controller 25, but this is not limitative. The present modification example is described in detail below.

An image display device 1A according to the modification example includes an image processor 10A, as with the image display device 1 (FIG. 1) according to the present embodiment. The image processor 10A includes a processor 22A and a switching controller 25A, as with the image processor 10 (FIG. 1) according to the present embodiment.

The processor 22A is configured to perform processing on the basis of the internal synchronization signal S1 generated by the switching controller 25A in a case where the processor 22A performs the processing at a timing corresponding to the output synchronization signal Vsync2 (operation modes MA and MC), and perform the processing at a timing at which the processing by the processor 21 ends in a case where the processor 22A performs the processing at a timing corresponding to the input synchronization signal Vsync1 (operation mode MB).

The switching controller 25A determines at which timing of the timing corresponding to the input synchronization signal Vsync1 and the timing corresponding to the output synchronization signal Vsync2 the processor 22A is to perform the processing, on the basis of the control data CTL. Then, in a case where the switching controller 25A determines that the processor 22A is to perform the processing at the timing corresponding to the output synchronization signal Vsync2 (operation modes MA and MC), the switching controller 25A generates the internal synchronization signal S1 on the basis of the timing corresponding to the output synchronization signal Vsync2. In addition, in a case where the switching controller 25A determines that the processor 22A is to perform the processing at the timing corresponding to the input synchronization signal Vsync1 (operation mode MB), the switching controller 25A instructs the processor 22A to perform the processing at a timing at which the processing by the processor 21 ends.

FIG. 10 illustrates an operation example of the image processor 10A in the operation mode MB. FIG. 10 corresponds to FIG. 5 according to the present embodiment. In the operation mode MB, the switching controller 25A instructs the processor 22A to perform the processing at the timing at which the processing by the processor 21 ends. Accordingly, the processor 22A performs the processing at the timing at which the processing by the processor 21 ends ((B) and (C) of FIG. 10). Specifically, for example, the processor 21 performs the processing in a period from a timing t114 to a timing t115, and the processor 22A starts the processing at the timing t115. In addition, for example, the processor 21 performs the processing in a period from a timing t117 to a timing t118, and the processor 22A starts the processing at the timing t118. The processor 21 performs the processing at a timing corresponding to the input synchronization signal Vsync1. Accordingly, the processor 22A that performs the processing following the processing by the processor 21 also performs the processing at a timing corresponding to the input synchronization signal Vsync1.

Even in this case, the time Δt4 is set to cause a timing t116 at which the pulse of the output synchronization signal Vsync2 is generated to be later than a timing at which the processing ((C) of FIG. 10) by the processor 22A starting from the timing t115 ends. This makes it possible for the processor 23 to perform the processing after the processing by the processor 22A ends ((C) and (E) of FIG. 10).

Accordingly, for example, in a period from the timing t114 to the timing t117, the processor 21 starts the processing at the timing t114 ((B) of FIG. 10), the processor 22A starts the processing at the timing t115 at which the processing by the processor 21 ends ((C) of FIG. 10), and the processor 23 starts the processing at the timing t116 at which the processing by the processor 22A ends ((E) of FIG. 10). Likewise, in a period from the timing 1117 to a timing t120, the processor 21 starts the processing at the timing t117 ((B) of FIG. 10), the processor 22A starts the processing at the timing t118 at which the processing by the processor 21 ends ((C) of FIG. 10), and the processor 23 starts the processing at a timing t119 after the processing by the processor 22A ends ((E) of FIG. 10).

Although the present technology has been described above with reference to the embodiment and the modification example, the present technology is not limited to the embodiment and the like, and may be modified in a variety of ways.

For example, the frame rates illustrated in FIGS. 2, 4, 5, and 7 are examples, and the image display device 1 is operable at any of various frame rates.

It is to be noted that the effects described herein are merely illustrative and non-limiting, and other effects may be included.

It is to be noted that the present technology may have the following configurations. According to the present technology having the following configurations, it is possible to suppress degradation in image quality.

(1)

An image processing device including:
an input section that receives an input image signal including an input synchronization signal and input image data;
a first processor that performs first processing on the basis of the input image data at a timing corresponding to the input synchronization signal;
a synchronization signal generator that generates an output synchronization signal;
a second processor that performs second processing on the basis of a processing result of the first processing at a timing corresponding to the input synchronization signal or a timing corresponding to the output synchronization signal;
a controller that controls at which timing of the timing corresponding to the input synchronization signal and the timing corresponding to the output synchronization signal the second processor is to perform the second processing;
a third processor that performs third processing on the basis of a processing result of the second processing at a timing corresponding to the output synchronization signal to generate output image data; and
an output section that outputs an output image signal including the output synchronization signal and the output image data.

(2)

The image processing device according to (1), in which a delay time between a timing at which the input image signal is inputted to the input section and a timing at which the output image signal is outputted from the output section is shorter than a time length of one period of the input synchronization signal.

(3)

The image processing device according to (1) or (2), further including a frame memory, in which
the first processing includes processing for determining an address where the input image data is to be written to the frame memory, and
the second processing includes processing for determining an address where the output image data is to be read from the frame memory.

(4)

The image processing device according to any one of (1) to (3), in which
the input image signal includes control data that indicates whether or not a frame rate is variable, and
the controller determines at which timing of the timing corresponding to the input synchronization signal and the timing corresponding to the output synchronization signal the second processor is to perform the second processing, on the basis of the control data.

(5)

The image processing device according to (4), in which
the image processing device has a first operation mode and a second operation mode,
the second processor preforms the second processing at the timing corresponding to the output synchronization signal in the first operation mode, and performs the second processing at the timing corresponding to the input synchronization signal in the second operation mode, and
on the basis of the control data, the controller controls the image processing device to operate in the first operation mode in a case where the frame rate is fixed, and controls the image processing device to operate in the second operation mode in a case where the frame rate is variable.

(6)

The image processing device according to (5), in which
the controller further controls an operation of the synchronization signal generator, and
the synchronization signal generator generates the output synchronization signal having a predetermined pulse frequency in the first operation mode, and generates the output synchronization signal corresponding to the input synchronization signal in the second operation mode.

(7)

The image processing device according to (6), in which, in a case where a frame rate of the input image signal and a frame rate of the output image signal are equal to each other in the first operation mode, the synchronization signal generator generates the output synchronization signal having the predetermined pulse frequency and performs a phase adjustment operation to shift a phase of the output synchronization signal from a phase of the input synchronization signal by a predetermined amount.

(8)

The image processing device according to (6) or (7), in which, in a case where a frame rate of the input image signal and a frame rate of the output image signal are different from each other in the first operation mode, the synchronization signal generator generates the output synchronization signal having the predetermined pulse frequency.

(9)

The image processing device according to any one of (6) to (8), further including a setting section that performs first setting or second setting, in which
  the image processing device has a third operation mode,
  the second processor performs the second processing at the timing corresponding to the output synchronization signal in the third operation mode,
  the synchronization signal generator generates the output synchronization signal having the predetermined pulse frequency in the third operation mode,
  for the frame rate being variable, the controller controls the image processing device to operate in the second operation mode in a case where setting of the setting section is the first setting, and controls the image processing device to operate in the third operation mode in a case where setting of the setting section is the second setting.

(10)

An image processing method including:
  an input section that receives an input image signal including an input synchronization signal and input image data;
  performing first processing on the basis of the input image data at a timing corresponding to the input synchronization signal;
  generating an output synchronization signal;
  performing second processing on the basis of a processing result of the first processing at a timing corresponding to the input synchronization signal or a timing corresponding to the output synchronization signal;
  controlling at which timing of the timing corresponding to the input synchronization signal and the timing corresponding to the output synchronization signal the second processing is to be performed;
  performing third processing on the basis of a processing result of the second processing at a timing corresponding to the output synchronization signal to generate output image data; and
  outputting an output image signal including the output synchronization signal and the output image data.

(11)

An image display device including:
  an image processing device; and
  a display panel that performs a display operation on the basis of an image signal processed by the image processing device,
  the image processing device including
    an input section that receives an input image signal including an input synchronization signal and input image data,
    a first processor that performs first processing on the basis of the input image data at a timing corresponding to the input synchronization signal,
    a synchronization signal generator that generates an output synchronization signal,
    a second processor that performs second processing on the basis of a processing result of the first processing at a timing corresponding to the input synchronization signal or a timing corresponding to the output synchronization signal,
    a controller that controls at which timing of the timing corresponding to the input synchronization signal and the timing corresponding to the output synchronization signal the second processor is to perform the second processing,
    a third processor that performs third processing on the basis of a processing result of the second processing at a timing corresponding to the output synchronization signal to generate output image data, and
    an output section that outputs an output image signal including the output synchronization signal and the output image data.

This application claims the priority on the basis of Japanese Patent Application No. 2021-009056 filed on Jan. 22, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image processing device comprising:
  an input section that receives an input image signal including an input synchronization signal and input image data;
  a first processor that performs first processing on a basis of the input image data at a timing corresponding to the input synchronization signal;
  a synchronization signal generator that generates an output synchronization signal;
  a second processor that performs second processing on a basis of a processing result of the first processing at a timing corresponding to the input synchronization signal or a timing corresponding to the output synchronization signal;
  a controller that controls at which timing of the timing corresponding to the input synchronization signal and the timing corresponding to the output synchronization signal the second processor is to perform the second processing;
  a third processor that performs third processing on a basis of a processing result of the second processing at a timing corresponding to the output synchronization signal to generate output image data; and
  an output section that outputs an output image signal including the output synchronization signal and the output image data, wherein
  the input image signal includes control data that indicates whether or not a frame rate is variable,
  the image processing device has a first operation mode and a second operation mode,
  the second processor preforms the second processing at the timing corresponding to the output synchronization signal in the first operation mode, and performs the second processing at the timing corresponding to the input synchronization signal in the second operation mode, and on a basis of the control data, the controller controls the image processing device to operate in the first operation mode in a case where the frame rate is fixed, and controls the image processing device to operate in the second operation mode in a case where the frame rate is variable.

2. The image processing device according to claim 1, wherein a delay time between a timing at which the input image signal is inputted to the input section and a timing at which the output image signal is outputted from the output section is shorter than a time length of one period of the input synchronization signal.

3. The image processing device according to claim 1, further comprising a frame memory, wherein the first processing includes processing for determining an address where the input image data is to be written to the frame memory, and the second processing includes processing for determining an address where the output image data is to be read from the frame memory.

4. The image processing device according to claim 1, wherein the controller determines at which timing of the timing corresponding to the input synchronization signal and the timing corresponding to the output synchronization signal the second processor is to perform the second processing, on a basis of the control data.

5. The image processing device according to claim 1, wherein the controller further controls an operation of the synchronization signal generator, and the synchronization signal generator generates the output synchronization signal having a predetermined pulse frequency in the first operation mode, and generates the output synchronization signal corresponding to the input synchronization signal in the second operation mode.

6. The image processing device according to claim 5, wherein, in a case where a frame rate of the input image signal and a frame rate of the output image signal are equal to each other in the first operation mode, the synchronization signal generator generates the output synchronization signal having the predetermined pulse frequency and performs a phase adjustment operation to shift a phase of the output synchronization signal from a phase of the input synchronization signal by a predetermined amount.

7. The image processing device according to claim 5, wherein, in a case where a frame rate of the input image signal and a frame rate of the output image signal are different from each other in the first operation mode, the synchronization signal generator generates the output synchronization signal having the predetermined pulse frequency.

8. The image processing device according to claim 5, further comprising a setting section that performs first setting or second setting, wherein the image processing device has a third operation mode, the second processor performs the second processing at the timing corresponding to the output synchronization signal in the third operation mode, the synchronization signal generator generates the output synchronization signal having the predetermined pulse frequency in the third operation mode, for the frame rate being variable, the controller controls the image processing device to operate in the second operation mode in a case where setting of the setting section is the first setting, and controls the image processing device to operate in the third operation mode in a case where setting of the setting section is the second setting.

9. An image processing method for controlling an image processing device, the image processing method comprising:

receiving an input image signal including an input synchronization signal and input image data;

performing first processing on a basis of the input image data at a timing corresponding to the input synchronization signal;

generating an output synchronization signal;

performing second processing on a basis of a processing result of the first processing at a timing corresponding to the input synchronization signal or a timing corresponding to the output synchronization signal;

controlling at which timing of the timing corresponding to the input synchronization signal and the timing corresponding to the output synchronization signal the second processing is to be performed;

performing third processing on a basis of a processing result of the second processing at a timing corresponding to the output synchronization signal to generate output image data;

outputting an output image signal including the output synchronization signal and the output image data, wherein the input image signal includes control data that indicates whether or not a frame rate is variable, the image processing device has a first operation mode and a second operation mode, the second processing is performed at the timing corresponding to the output synchronization signal in the first operation mode, and the second processing is performed at the timing corresponding to the input synchronization signal in the second operation mode; and on a basis of the control data, controlling the image processing device to operate in the first operation mode in a case where the frame rate is fixed, and controlling the image processing device to operate in the second operation mode in a case where the frame rate is variable.

10. An image display device comprising:

an image processing device; and a display panel that performs a display operation on a basis of an image signal processed by the image processing device, the image processing device including an input section that receives an input image signal including an input synchronization signal and input image data, a first processor that performs first processing on a basis of the input image data at a timing corresponding to the input synchronization signal, a synchronization signal generator that generates an output synchronization signal, a second processor that performs second processing on a basis of a processing result of the first processing at a timing corresponding to the input synchronization signal or a timing corresponding to the output synchronization signal, a controller that controls at which timing of the timing corresponding to the input synchronization signal and the timing corresponding to the output synchronization signal the second processor is to perform the second processing, a third processor that performs third processing on a basis of a processing result of the second processing at a timing corresponding to the output synchronization signal to generate output image data, and an output section that outputs an output image signal including the output synchronization signal and the output image data, wherein the input image signal includes control data that indicates whether or not a frame rate is variable, the image processing device has a first operation mode and a second operation mode, the second processor preforms the second processing at the timing corresponding to the output synchronization signal in the first operation mode, and performs the second processing at the timing corresponding to the input synchronization signal in the second operation mode, and on a basis of the control data, the controller controls the image processing device to operate in the first operation mode in a case where the frame rate is fixed, and controls the image processing device to operate in the second operation mode in a case where the frame rate is variable.

11. A non-transitory computer readable medium storing program code for image processing by an image processing device, the program code being executable by a processor to perform operations comprising:

receiving an input image signal including an input synchronization signal and input image data;

performing first processing on a basis of the input image data at a timing corresponding to the input synchronization signal;

generating an output synchronization signal;

performing second processing on a basis of a processing result of the first processing at a timing corresponding to the input synchronization signal or a timing corresponding to the output synchronization signal;

controlling at which timing of the timing corresponding to the input synchronization signal and the timing corresponding to the output synchronization signal the second processing is to be performed;

performing third processing on a basis of a processing result of the second processing at a timing corresponding to the output synchronization signal to generate output image data; and outputting an output image signal including the output synchronization signal and the output image data, wherein the input image signal includes control data that indicates whether or not a frame rate is variable, the image processing device has a first operation mode and a second operation mode, the second processing is performed at the timing corresponding to the output synchronization signal in the first operation mode, and the second processing is performed at the timing corresponding to the input synchronization signal in the second operation mode; and on a basis of the control data, controlling the image processing device to operate in the first operation mode in a case where the frame rate is fixed, and controlling the image processing device to operate in the second operation mode in a case where the frame rate is variable.

12. The non-transitory computer readable medium according to claim 11, wherein a delay time between a timing at which the input image signal is inputted and a timing at which the output image signal is outputted is shorter than a time length of one period of the input synchronization signal.

13. The non-transitory computer readable medium according to claim 11, wherein the first processing includes processing for determining an address where the input image data is to be written to a frame memory, and the second processing includes processing for determining an address where the output image data is to be read from the frame memory.

14. The non-transitory computer readable medium according to claim 11, wherein the input image signal includes control data that indicates whether or not a frame rate is variable, and wherein the operations further comprise determining at which timing of the timing corresponding to the input synchronization signal and the timing corresponding to the output synchronization signal of the second processing, on a basis of the control data.

15. The non-transitory computer readable medium according to claim 11, wherein the operations further comprise:

generating the output synchronization signal having a predetermined pulse frequency in the first operation mode, and generating the output synchronization signal corresponding to the input synchronization signal in the second operation mode.

16. The non-transitory computer readable medium according to claim 15, wherein, in a case where a frame rate of the input image signal and a frame rate of the output image signal are equal to each other in the first operation mode, the operations further comprise generating the output synchronization signal having the predetermined pulse frequency and performs a phase adjustment operation to shift a phase of the output synchronization signal from a phase of the input synchronization signal by a predetermined amount.

17. The non-transitory computer readable medium according to claim 15, wherein, in a case where a frame rate of the input image signal and a frame rate of the output image signal are different from each other in the first operation mode, the operations further comprise generating the output synchronization signal having the predetermined pulse frequency.

18. The non-transitory computer readable medium according to claim 15, wherein the operations further comprise:

performing a first setting or a second setting, wherein the image processing device has a third operation mode, and the second processing is performed at the timing corresponding to the output synchronization signal in the third operation mode;

generating the output synchronization signal having the predetermined pulse frequency in the third operation mode; and for the frame rate being variable, controlling the image processing device to operate in the second operation mode in a case where the setting is the first setting, and controlling the image processing device to operate in the third operation mode in a case where setting of the second setting.

* * * * *